(12) United States Patent
Kato

(10) Patent No.: US 8,190,949 B2
(45) Date of Patent: *May 29, 2012

(54) OPERATIONS MANAGEMENT APPARATUS, OPERATIONS MANAGEMENT SYSTEM, DATA PROCESSING METHOD, AND OPERATIONS MANAGEMENT PROGRAM

(75) Inventor: Kiyoshi Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,228

(22) Filed: May 23, 2011

(65) Prior Publication Data

US 2011/0225462 A1    Sep. 15, 2011

Related U.S. Application Data

(63) Continuation of application No. 12/391,435, filed on Feb. 24, 2009, now Pat. No. 7,975,186.

(30) Foreign Application Priority Data

Feb. 25, 2008 (JP) .................................. 43046/2008

(51) Int. Cl.
G06F 11/00 (2006.01)

(52) U.S. Cl. ........................................ 714/47.1; 714/48

(58) Field of Classification Search ................. 714/47.1, 714/47.2, 47, 3, 45, 46, 48
See application file for complete search history.

(56) References Cited

U.S. PATENT DOCUMENTS

| | | | |
|---|---|---|---|
| 2007/0016476 A1* | 1/2007 | Hoffberg et al. | 705/14 |
| 2009/0216624 A1* | 8/2009 | Kato | 705/10 |
| 2011/0010581 A1* | 1/2011 | Tanttu et al. | 714/11 |

* cited by examiner

Primary Examiner — Dieu-Minh Le

(57) ABSTRACT

An operations management apparatus which acquires performance information for each of a plurality of performance items from a plurality of controlled units and manages operation of the controlled units includes a correlation model generation unit which derives a correlation function between a first series of performance information that indicates time series variation about a first element and a second series of performance information that indicates time series variation about a second element, generates a correlation model between the first element and the second element based on the correlation function, and obtains the correlation model for each element pair of the performance information, and a correlation change analysis unit which analyzes a change in the correlation model based on the performance information acquired newly which has not been used for generation of the correlation model.

17 Claims, 20 Drawing Sheets

FIG.3

12a PERFORMANCE INFORMATION

| TIME | PERFORMANCE ITEM | SV1.CPU | SV1.MEM | ... | SV2.CPU | ... |
|---|---|---|---|---|---|---|
| ... | | ... | ... | ... | ... | ... |
| 2007/10/05 17:25 | | 12 | 80 | ... | 33 | ... |
| 2007/10/05 17:26 | | 15 | 79 | ... | 32 | ... |
| 2007/10/05 17:27 | | 34 | 51 | ... | 32 | ... |
| 2007/10/05 17:28 | | 63 | 51 | ... | 35 | ... |
| 2007/10/05 17:29 | | 20 | 81 | ... | 50 | ... |
| 2007/10/05 17:30 | | 10 | 78 | ... | 51 | ... |
| 2007/10/05 17:31 | | 11 | 79 | ... | 34 | ... |
| ... | | ... | ... | ... | ... | ... |
| 2007/11/07 8:31 | | 20 | 79 | ... | 90 | ... |

FIG.7

| INPUT | OUTPUT | A | B | ... | W | ... | EFFECTIVE | ... |
|---|---|---|---|---|---|---|---|---|
| SV1.CPU | SV1.MEM | −0.6 | 100 | ... | 0.88 | ... | ○ | ... |
| ... | ... | ... | ... | ... | ... | ... | ... | ... |

116a CORRELATION MODEL

FIG.8

| INPUT | OUTPUT | A | B | ... | W | ... | EFFECTIVE | ... |
|---|---|---|---|---|---|---|---|---|
| SV1.CPU | SV1.MEM | −0.6 | 100 | ... | 0.88 | ... | ○ | ... |
| ... | ... | ... | ... | ... | ... | ... | ... | ... |
| SV3.CPU | SV3.MEM | −0.3 | 100 | ... | 0.63 | ... | ○ | ... |
| SV3.CPU | SV2.MEM | 2 | −10 | ... | 0.51 | ... | ○ | ... |
| ... | ... | ... | ... | ... | ... | ... | ... | ... |

116b CORRELATION MODELS

| INPUT | OUTPUT | A | B | ... | W | ... | EFFECTIVE | ... |
|---|---|---|---|---|---|---|---|---|
| SV1.CPU | SV1.MEM | −0.6 | 100 | ... | 0.88 | ... | ○ | ... |
| ... | ... | ... | ... | ... | ... | ... | ... | ... |
| SV3.CPU | SV3.MEM | −0.3 | 100 | ... | 0.63 | ... | × | ... |
| SV3.CPU | SV2.MEM | 2 | −10 | ... | 0.51 | ... | × | ... |
| ... | ... | ... | ... | ... | ... | ... | ... | ... |

216b CORRELATION MODELS

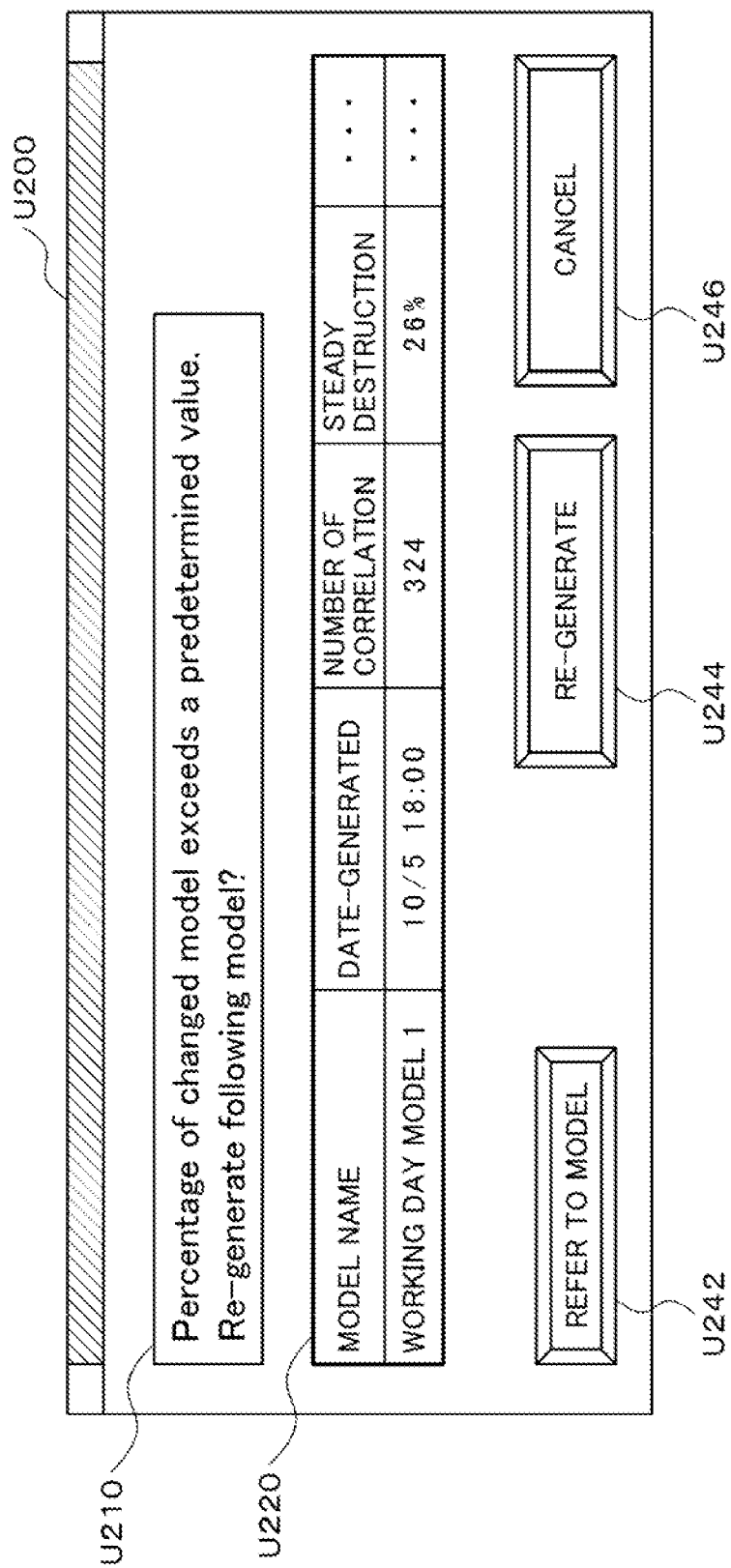

OPERATIONS MANAGEMENT APPARATUS, OPERATIONS MANAGEMENT SYSTEM, DATA PROCESSING METHOD, AND OPERATIONS MANAGEMENT PROGRAM

This is a continuation application of U.S. patent application Ser. No. 12/391,435 filed Feb. 24, 2009, and issued on Jul. 5, 2011, as U.S. Pat. No. 7,975,186, and claims the benefit of its priority.

TECHNICAL FILED

The present invention relates to an operations management apparatus, an operations management system, a data processing method and an operations management program, and in particular, relates to an operations management apparatus which correctly detects and localizes performance deterioration of a system providing an information and communications service.

BACKGROUND ART

In relatively large scale systems such as a business information system and an IDC (Internet Data Center) system, as the importance of an information and communications service such as a web service and a business service as a social infrastructure rises, stable operation of an apparatus (e.g. a server) providing such services is important. Operations management of such an apparatus has been performed by an administrator manually. As an apparatus becomes more complicated and large-scaled, burden on an administrator associated with knowledge and operation increases by leaps and bounds, causing a situation such as service suspension triggered by an error in judgment and by an operation mistake.

In order to handle such a situation, an integrated operations management system which monitors and controls hardware or software included in a system unitarily is provided.

This integrated operations management system acquires information about an operation status of a plurality of hardware or of software which is an administration object on-line, and outputs it to a operation management apparatus which is connected to the integrated operations management system. A method to distinguish a failure of a system being an administration object includes a method to set a threshold value to performance information in advance and a method to evaluate a difference from a mean value. When it is determined that there is a failure, the location of the failure is reported.

For example, in an operations management apparatus of such an integrated operations management system, a failure is detected by setting a threshold value for each performance information item and detecting each performance information item exceeding the threshold value. The operations management apparatus sets a value which is considered undeniably abnormal as the threshold value in advance, and detects abnormality of each element of performance information.

When the location of the failure has been reported, narrowing down its cause such as whether it is caused by a lack of a memory capacity, an excessive CPU load, an excessive network load or the like is needed for a failure solution. Because clarification of the cause generally requires an examination of system log or a parameter of a computer which might be related to the failure as well as system engineer's experience and sense, time and energy is needed.

For this reason, in an integrated operations management system, it is important to perform handling support by performing an analysis of such as combination of an abnormal states automatically based on event data (state notification) collected from a plurality of equipment, and by presuming a problem and a cause broadly to notify an administrator.

In particular, in order to ensure reliability during long term continual practical use of a service, it is required to detect not only abnormality which has occurred but also a state such as of performance deterioration which is not showing clear abnormality currently or of a sign of a failure expected to occur in the future, and to perform deliberate equipment reinforcement.

A technology in relation to such integrated operations management system includes the followings, for example.

An operations management apparatus of Japanese Patent Application Laid-Open No. 2006-024017 identifies an amount of a load caused by specific processing by comparing the history of the processing of a system element and the history of a change in performance information, and analyzes a load for an amount of the processing in the future. This operations management apparatus can identify behavior of a system when a relation between processing and a load can be figured out in advance.

An operations management system of Japanese Patent Application Laid-Open No. 2002-392182 identifies a component which is a cause of a failure by quantifying a magnitude of relation between components of a system based on operation information. This operations management apparatus enumerates candidates of the cause for an element which has become abnormal by weighting and displaying elements which have a correlation with the performance value as of that moment as a list.

That is, an operations management system of Japanese Patent Application Laid-Open No. 2002-342182 includes a managed system, a network and an operations management server. Operation information on each component collected via an operation information collection adapter from the managed system is stored in an operation information storage unit of an operations management server. In an analysis arithmetic processor of an operations management server, one arbitrary operation information item or one operation information item which has exceeded the range of a value set in advance is selected, and magnitude of relation with other operation information items besides that item is quantified. In case of calculation of quantification, an analysis processor extracts operation information which is needed from an operation information collection unit sequentially. When a quantified value of relation of an operation information item among the target operation information items of the calculation exceeds the range of the value set in advance, the analysis arithmetic processor determines that the operation information item has a high possibility to be a cause of a bottleneck of performance or a failure, and reports it to an input/output unit of an operations management server.

In an operations management apparatus of Japanese Patent Application Laid-Open No. 2006-146668, an operation information collection unit acquires hardware operation information of such as a CPU, a Network IO (network Input/Output) and the like and application operation information of such as access volume of a Web server and a processing query amount of a DB server from a plurality of apparatus in a system which is the target of monitoring at regular time intervals using ICMP, SNMP and rsh, and stores it in operation information DB. A pre-processing unit performs statistical processing which obtains a statistical analytical value between operation information on each constituent element stored in operation information DB. The pre-processing unit finds a statistical analytical value by obtaining the coefficient of correlation between individual operation information or by performing main component analysis between individual operation information, for example. This statistical analytical value indicates the degree of association between operation information on each apparatus in a given time. For example, in FIG. 2 of Japanese Patent Application Laid-Open No. 2006-146668, the coefficient of correlation of the CPU utilization rate of server 1 and the CPU utilization rate of server 2 is 0.93. A coefficient of correlation represents the degree of the correlation between two variables. First, this operations management apparatus periodically acquires hardware operation information such as a CPU utilization rate from a server and a network device and the like which are monitoring targets and, in the case of a Web server, application level information such as access situations, and then calculates "the relation between acquired values" which characterizes each situation using a statistical method such as a correlative analysis and main component analysis from operation information in each situation such as of the time of normal access and of the time of a failure, and defines a model of each situation and hold it in model information DB. Next, at the time of operation, calculation is performed for the current operation information using the same statistical method as the models which have been defined periodically or occasionally triggered by an alert of a failure or by a decline of response of a provided service, and the result thereof is compared with the defined models stored in model information DB to identify the situation of a corresponding model as the situation at present.

In an operations management apparatus of Japanese Patent Application Laid-Open No. 2007-207117, a monitor unit acquires status information related to a state of AC environment and non-AC environment. An analysis unit or a model diagnosis unit judges a state of an apparatus in AC environment based on acquired status information. A simulation unit refers to a countermeasure list corresponding to the judgment result, carries out simulation processing by a countermeasure included in the countermeasure list and evaluates the effect of the each countermeasure. A model extraction unit plots monitoring data of at times 1-3 in a coordinate system representing relation of the usage rate of a CPU to time, and extracts a model which expresses a time series change of the CPU usage rate by obtaining a linear approximation equation ($fa(x)=\alpha x+\beta$) for each monitoring data plotted. A model extraction unit accumulates the extracted model in a knowledge information accumulation unit. Similarly, the model extraction unit obtains a model also in a coordinate system representing relation of the throughput to time. The model extraction unit obtains linear approximation equations ($fTA(x)=\rho 1x+\theta 1$ and $fTB(x)=\rho 2x+\theta 2$) representing correlation between the CPU utilization rate and the throughput for each of processing A and processing B using a correlative analysis and a multivariate analysis to these two models, and extracts a model which indicates a correlation between the CPU utilization rate and the throughput. A model diagnosis unit refers to a policy corresponding to each model respectively and performs diagnosis (paragraph numbers 0060-0062 of Japanese Patent Application Laid-Open No. 2007-207117).

In Published Japanese translation of PCT application No. 2005-524886 bulletin, a collector is started based on a type of a workload during operation on the computer, and a threshold value for a metrics is set based on the workload. Next, it is determined when the metrics exceeds the threshold value (according to both of the present workload and an predicted workload), and a correlation between each metrics is obtained to judge whether the hardware capacity is the cause of the problem.

SUMMARY

An exemplary object of the invention is to provide an operations management apparatus, an operations management system, a data processing method and an operations management program capable of detecting a sign of a failure and of identifying an occurring place.

An operations management apparatus which acquires performance information for each of a plurality of performance items from a plurality of controlled units and manages operation of the controlled unit according to an exemplary aspect of the invention includes a correlation model generation unit which derives, when the performance items or the controlled units are designated as an element of performance information, a correlation function between a first series of performance information that indicates time series variation about a first element and a second series of performance information that indicates time series variation about a second element, generates a correlation model between the first element and the second element based on the correlation function, and obtains the correlation model for each element pair of the performance information, and a correlation change analysis unit which analyzes a change in the correlation model based on the performance information acquired newly which has not been used for generation of the correlation model.

The operations management system according to an exemplary aspect of the invention includes a plurality of controlled units, and an operations management apparatus which acquires performance information for each of a plurality of performance items from the plurality of controlled units and manages operation of the controlled units, wherein the operations management apparatus including a correlation model generation unit which derives, when the performance items or the controlled units are designated as an element of performance information, a correlation function between a first series of performance information that indicates time series variation about a first element and a second series of performance information that indicates time series variation about a second element, generates a correlation model between the first element and the second element based on the correlation function, and obtains the correlation model for each element pair of the performance information, and a correlation change analysis unit which analyzes a change in the correlation model based on the performance information acquired newly which has not been used for generation of the correlation model.

A data processing method of an operations management apparatus which acquires performance information for each of a plurality of performance items from a plurality of controlled units and manages operation of the controlled units according to an exemplary aspect of the invention includes obtaining a correlation Model for each element pair of performance information by deriving, when the performance items or the controlled units are designated as an element of the performance information, a correlation function between a first series of performance information that indicates time series variation about a first element and a second series of performance information that indicates time series variation about a second element, and generating the correlation model between the first element and the second element based on the correlation function, and analyzing a change in the correlation model based on the performance information acquired newly which has not been used for generation of the correlation model.

A computer readable medium embodying program, the program causing an operations management apparatus which acquires performance information for each of a plurality of performance items from a plurality of controlled units and manages operation of the controlled units to perform a method, according to an exemplary aspect of the invention includes obtaining a correlation model for each element pair of performance information by deriving, when the performance items or the controlled units are designated as an element of the performance information, a correlation function between a first series of performance information that indicates time series variation about a first element and a second series of performance information that indicates time series variation about a second element, and generating the correlation model between the first element and the second element based on the correlation function, and analyzing a change in the correlation model based on the performance information acquired newly which has not been used for generation of the correlation model.

An operations management apparatus which acquires performance information for each of a plurality of performance items from a plurality of controlled units and manages operation of the controlled units according to an exemplary aspect of the invention includes a correlation model generation means for deriving, when the performance items or the controlled units are designated as an element of performance information, a correlation function between a first series of performance information that indicates time series variation about a first element and a second series of performance information that indicates time series variation about a second element, generating a correlation model between the first element and the second element based on the correlation function, and obtaining the correlation model for each element pair of the performance information, and a correlation change analysis means for analyzing a change in the correlation model based on the performance information acquired newly which has not been used for generation of the correlation model.

A data processing method of an operations management apparatus which acquires performance information for each of a plurality of performance items from a plurality of controlled units and manages operation of the controlled units according to an exemplary aspect of the invention includes a step for obtaining a correlation model for each element pair of performance information by deriving, when the performance items or the controlled units are designated as an element of the performance information, a correlation function between a first series of performance information that indicates time series variation about a first element and a second series of performance information that indicates time series variation about a second element, and generating the correlation model between the first element and the second element based on the correlation function, and a step for analyzing a change in the correlation model based on the performance information acquired newly which has not been used for generation of the correlation model.

BRIEF DESCRIPTION OF THE DRAWINGS

Exemplary features and advantages of the present invention will become apparent from the following detailed description when taken with the accompanying drawings in which:

FIG. 3 is an exemplary diagram of performance information used in an operations management apparatus of the first exemplary embodiment.

FIG. 7 is an exemplary diagram of a data structure of a correlation model in an operations management apparatus of the first exemplary embodiment.

FIG. 8 is an exemplary diagram of another data structure of a correlation model in an operations management apparatus of the first exemplary embodiment.

FIG. 21 is an exemplary diagram of an indicated display screen in an operations management apparatus of the second exemplary embodiment.

EXEMPLARY EMBODIMENT

Basic configuration of Operations Management Apparatus

First, the basic configuration of an operations management apparatus will be described. An operations management apparatus (symbol 100 shown in FIG. 4, for example) of the exemplary embodiment acquires performance information for each of a plurality of performance items from a plurality of controlled units of a system and manages the operation of the controlled units.

This operations management apparatus includes: a correlation model generation unit (symbol 123 shown in FIG. 4, for example) derives, when above-mentioned performance items or the controlled units are designated as an element of performance information, a correlation function between a first series of performance information that indicates time series variation about a first element and a second series of performance information that indicates time series variation about a second element, generates a correlation model between the first element and the second element based on the correlation function, and obtains the correlation model for each element pair of the performance information, and a correlation change analysis unit (symbol 124 shown in FIG. 4, for example) which analyzes a change in the correlation model based on the performance information acquired newly which has not been used for generation of the correlation model.

In such an operations management apparatus, correlation model generation unit generates a correlation model by deriving a correlation function for time series information of two elements of performance information (a series of performance information). When new performance information which has not been used for generation of a correlation model is acquired, the correlation change analysis unit analyzes whether the performance information acquired newly is performance information conforming to a correlation function of a correlation model which has been already generated, that is, whether there is a change or not in the correlations in the correlation model (whether a correlation is kept or collapsed).

As a result, the operations management apparatus can specify the occurring place of an abnormality (an element with abnormality) according to whether a correlation generated at the time of normal operation is deformed or not. An operations management apparatus can detect performance abnormality such as response degradation and a sign of a failure correctly and specify an occurring place by modeling a correlation of detected performance information, and monitoring a change of the model.

Hereinafter, an exemplary embodiment in which such an operations management apparatus is applied to an operations management system will be described.

First Exemplary Embodiment

Entire Structure of Operations Management System

First, regarding the concrete configuration of an operations management system of a first exemplary embodiment, the entire structure is described, followed by a description of the detailed structure of each part.

Figure 1:
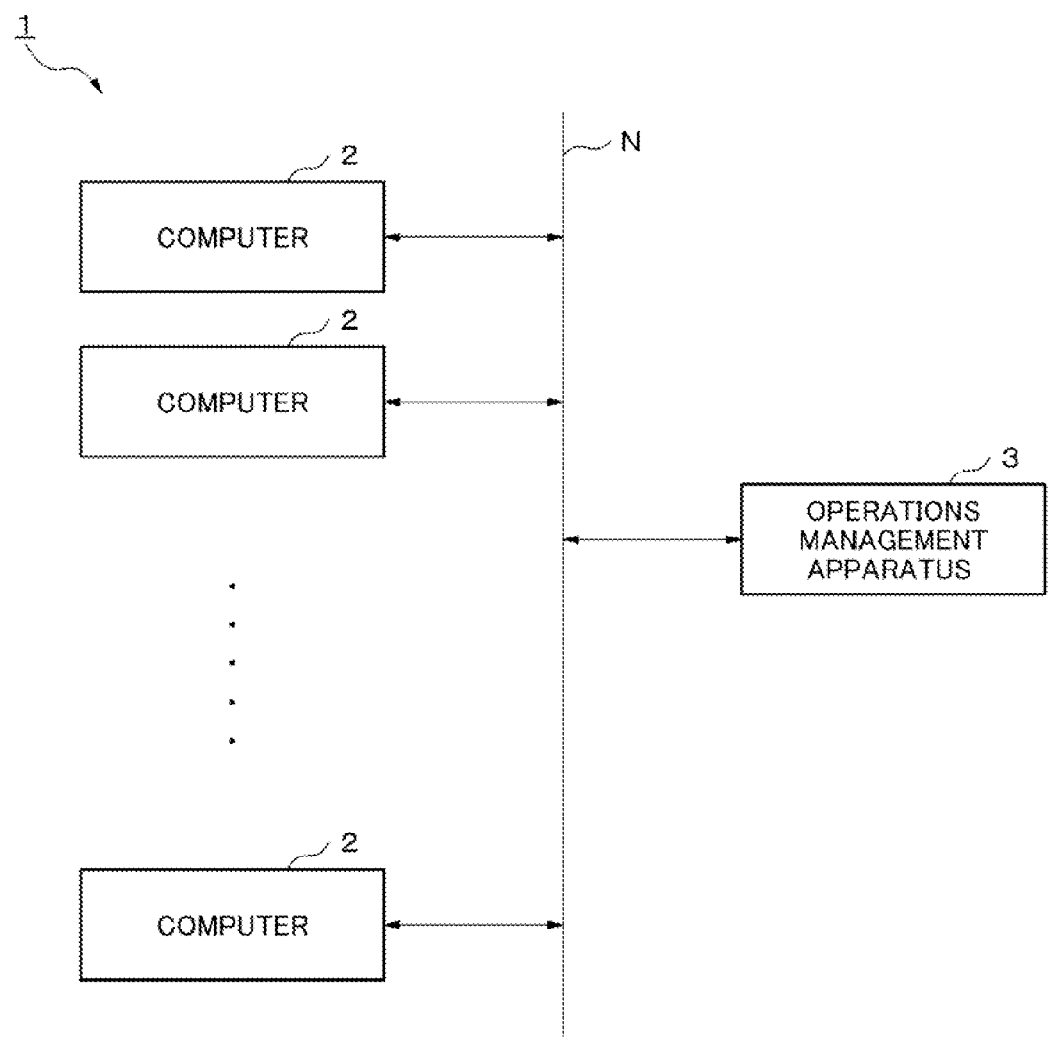
FIG. 1 is an exemplary block diagram of the entire structure of an operations management system including an operations management apparatus of a first exemplary embodiment.

FIG. 1 is an exemplary block diagram of the entire structure of an operations management system including an operations management apparatus of the first exemplary embodiment.

As shown in FIG. 1, operations management system 1 of the first exemplary embodiment includes computers 2 which are a plurality of controlled units, operations management apparatus 3 which is capable of communicating with computers 2 via network N, and manages the operation of computers 2.

Operations management apparatus 3 acquires performance information for each of a plurality of performance items (a CPU utilization factor and remaining memory capacity, for example) from the plurality of computers 2.

Computer 2 and operations management apparatus 3 may be any computer if it is operated by program control and includes a network related function, such as a desktop computer, a laptop computer, a server, or some other information devices having wireless or wired communication functions or a computer similar to this. Computer 2 and operations management apparatus 3 may be of a portable type or a stationary type.

The hardware configuration of operations management apparatus 3 includes a display unit (screen) indicating various information or the like, an operation input unit (such as a keyboard and a mouse, for example) performing operational input of data on the display screen of the display unit (such as on various input columns), a transmission and reception unit (a communication unit) sending and receiving various signals and data, a memory unit (such as a memory and a hard disk, for example) storing various programs and various data, a control unit (such as CPU, for example) which controls these units, and the like.

Computer 2 also may be a network device or other equipment, or a mainframe.

(Premised Configuration)

Here, the configuration of an operations management apparatus which is a premise of the first exemplary embodiment will be described referring to FIG. 2 and FIG. 3 before describing the characteristic configuration of the first exemplary embodiment.

Figure 2:
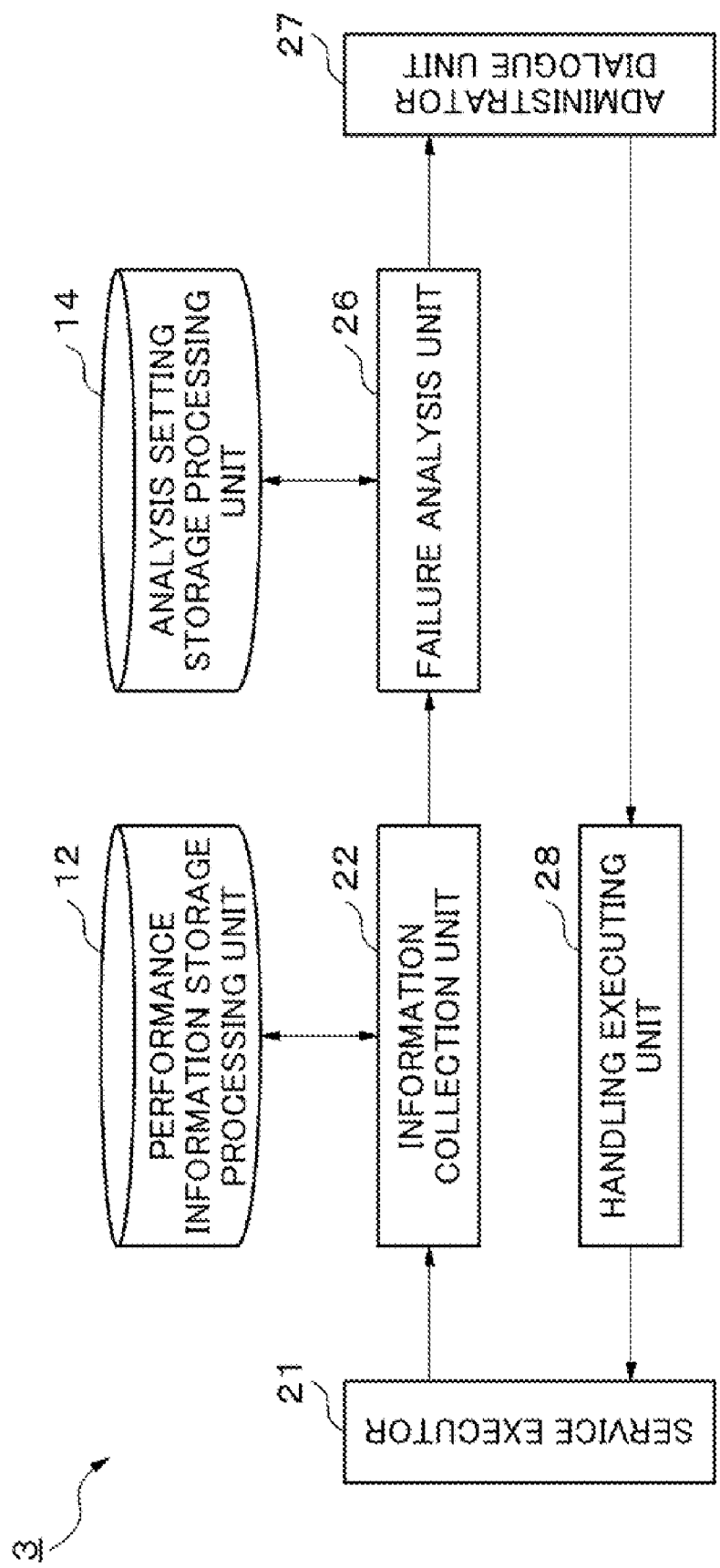
FIG. 2 is an exemplary block diagram of a configuration which is the premise of an operations management apparatus of the first exemplary embodiment.

FIG. 2 is an exemplary block diagram of a configuration which is the premise of an operations management apparatus of the first exemplary embodiment. Referring to FIG. 2, operations management apparatus 3 which indicates the configuration which is the premise of the first exemplary embodiment includes service executor 21, performance information storage processing unit 12, information collection unit 22, analysis setting storage processing unit 14, failure analysis unit 26, administrator dialogue unit 27 and handling executing unit 28.

Service executor 21 provides an information and communications service such as a web service and a business service. Service executor 21 may be on another independent computer or the like.

Performance information storage processing unit 12 accumulates each element of performance information of service executor 21.

Information collection unit 22 detects an operation state of service executor 21 and accumulates in performance information storage processing unit 12 performance information included in the operation state.

Analysis setting storage processing unit 14 accumulates an analysis setting to detect abnormality of service executor 21.

Failure analysis unit 26 receives an operation state from information collection unit 22 and performs failure analysis according to the analysis setting of analysis setting storage processing unit 14.

Administrator dialogue unit 27 receives a result of the failure analysis from failure analysis unit 26 and presents it to an administrator. Administrator dialogue unit 27 accepts administrator's input and instructs handling executing unit 28 to handle a failure according to administrator's input.

Handling executing unit 28 carries out processing which is handling for the failure on service executor 21 according to the instruction of administrator dialogue unit 27.

FIG. 3 is an exemplary diagram of performance information used by an operations management apparatus of the first exemplary embodiment. FIG. 3 shows performance information outputted by information collection unit 22 and accumulated in performance information storage processing unit 12. Each line of performance information 12a includes values for each performance item (element) at the same point of time, and the values are listed at regular time intervals.

Operation of operations management apparatus 3 having the premised configuration mentioned above will be described using FIG. 2 and FIG. 3.

First, information collection unit 22 of FIG. 2 detects an operation state of service executor 21 and accumulates performance information in performance information storage processing unit 12. For example, when a web service is carried out by service executor 21, information collection unit 22 detects CPU utilization rate and remaining memory capacity of each server which provides the web service at regular time intervals.

Performance information 12a of FIG. 3 is an example of the detected performance information. For example, SV1-CPU indicates a value of a CPU utilization factor of one server, and the value at time 17:25 of Oct. 5, 2007 is 12. The values of 15, 34 and 63 are detected at one minute intervals from 17:26. Similarly, SV1-MEM is the value of the remaining memory capacity of the same server and SV2-CPU is the value of the CPU utilization factor of a different server detected at the same time of day.

Next, failure analysis unit 26 performs a failure analysis according to a analysis setting accumulated in analysis setting storage processing unit 14. As an analysis setting, a detection condition of a failure is designated such as when the CPU utilization factor exceeds a certain value, a warning message is presented to an administrator, for example. Failure analysis unit 26 determines whether a load of a specific server has become high or not from the value of the performance information detected by information collection unit 22 using a threshold value according to an analysis setting.

Administrator dialogue unit 27 presents a result of such failure analysis to an administrator. When an administrator performs an input operation which directs administrator dialogue unit 27 to perform some handling for the result of the failure analysis, administrator dialogue unit 27 carries out a handling command on service executor 21 via handling executing unit 28.

For example, when knowing that a CPU load has become high, the administrator reduces the amount of services or performs a configuration change for load sharing.

When a value of the performance information collected by information collection unit 22 at regular time intervals decreases after this, failure analysis unit 26 determines that the failure has been recovered and shows the result to the administrator via administrator dialogue unit 27. By a repeat of processing of such an information collection, analysis and handling, failure handling for service executor 21 continues to be performed.

In addition to such premised configuration, the present exemplary embodiment has a characteristic configuration indicated below.

(Characteristic Composition of the First Exemplary Embodiment)

Figure 4:
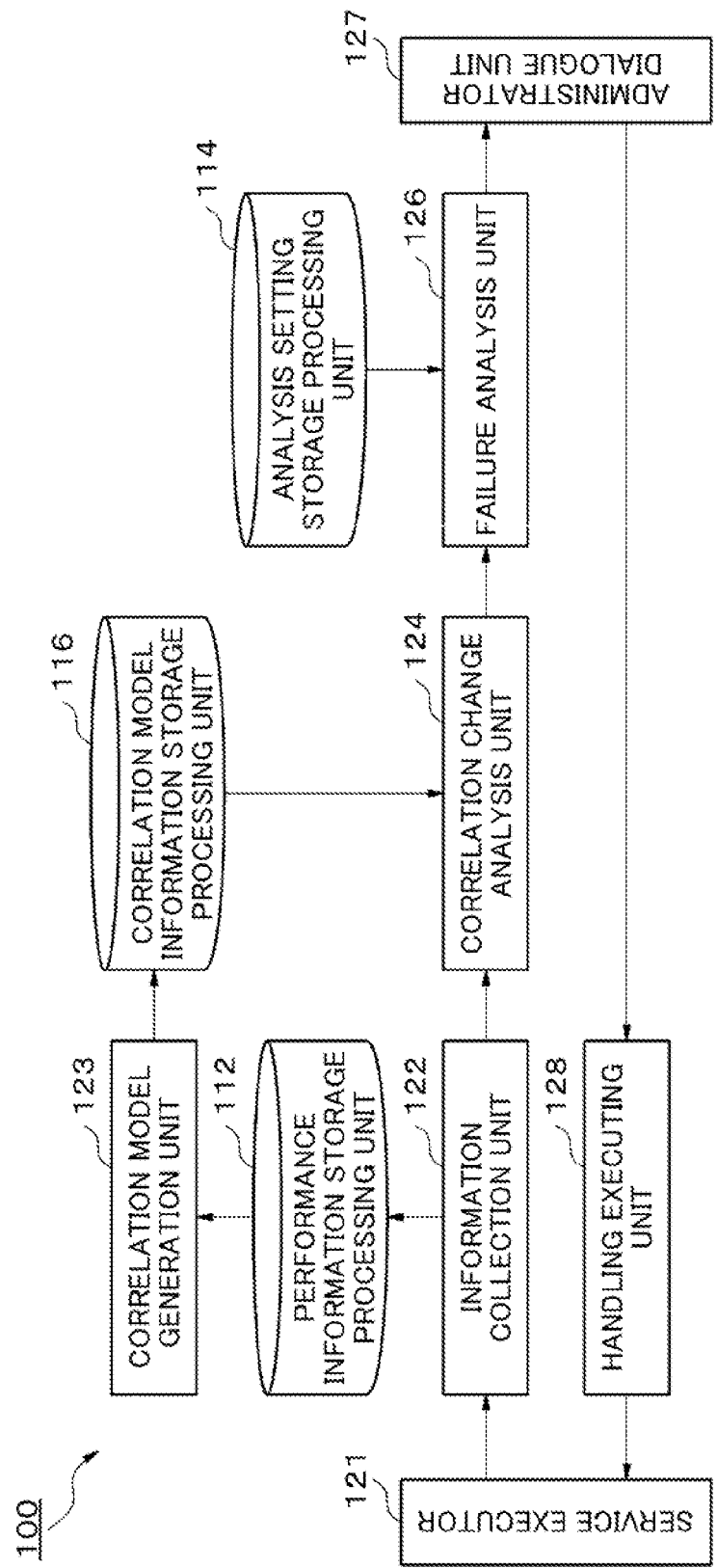
FIG. 4 is an exemplary block diagram of the entire structure of an operations management apparatus of the first exemplary embodiment.

Here, the characteristic configuration of an operations management apparatus of the first exemplary embodiment will be described with reference to FIG. 4. FIG. 4 is an exemplary block diagram of the entire structure of an operations management apparatus of the first exemplary embodiment.

As shown in FIG. 4, operations management apparatus 100 of the first exemplary embodiment is configured including correlation model generation unit 123, correlation model information storage processing unit 116 and correlation change analysis unit 124 in addition to service executor 121, performance information storage processing unit 112, information collection unit 122, analysis setting storage processing unit 114, failure analysis unit 126, administrator dialogue unit 127 and handling executing unit 128 which are the same compositions as operations management apparatus 3 shown in FIG. 2.

Correlation model generation unit 123 takes out performance information for a certain period from performance information storage processing unit 112, and derives, for time series of two discretionary elements of the performance information, a transform function when making one element as input and making the other as output. Then, correlation model generation unit 123 compares a series of values of the element generated by this transform function and a series of an actual detected value, and calculates the weight of the transform function from the difference between those values. By repeating these processing for all element pairs, correlation model generation unit 123 generates a correlation model of the overall operating state of service executor 121.

Correlation model information storage processing unit 116 accumulates the correlation model generated by correlation model generation unit 123.

Correlation change analysis unit 124 receives performance information acquired newly which has not been used for generation of a correlation model from information collection unit 122. Correlation change analysis unit 124 analyzes whether a value of an element included in the performance information acquired newly satisfies a relationship indicated by a transform function between each element of a correlation model accumulated in correlation model information storage processing unit 116 within a predetermined error range. Correlation change analysis unit 124 outputs the result.

Failure analysis unit 126 receives the result of the analysis of correlation change analysis unit 124 and performs a failure analysis as well as other analyses such as a threshold determination.

Figure 5:
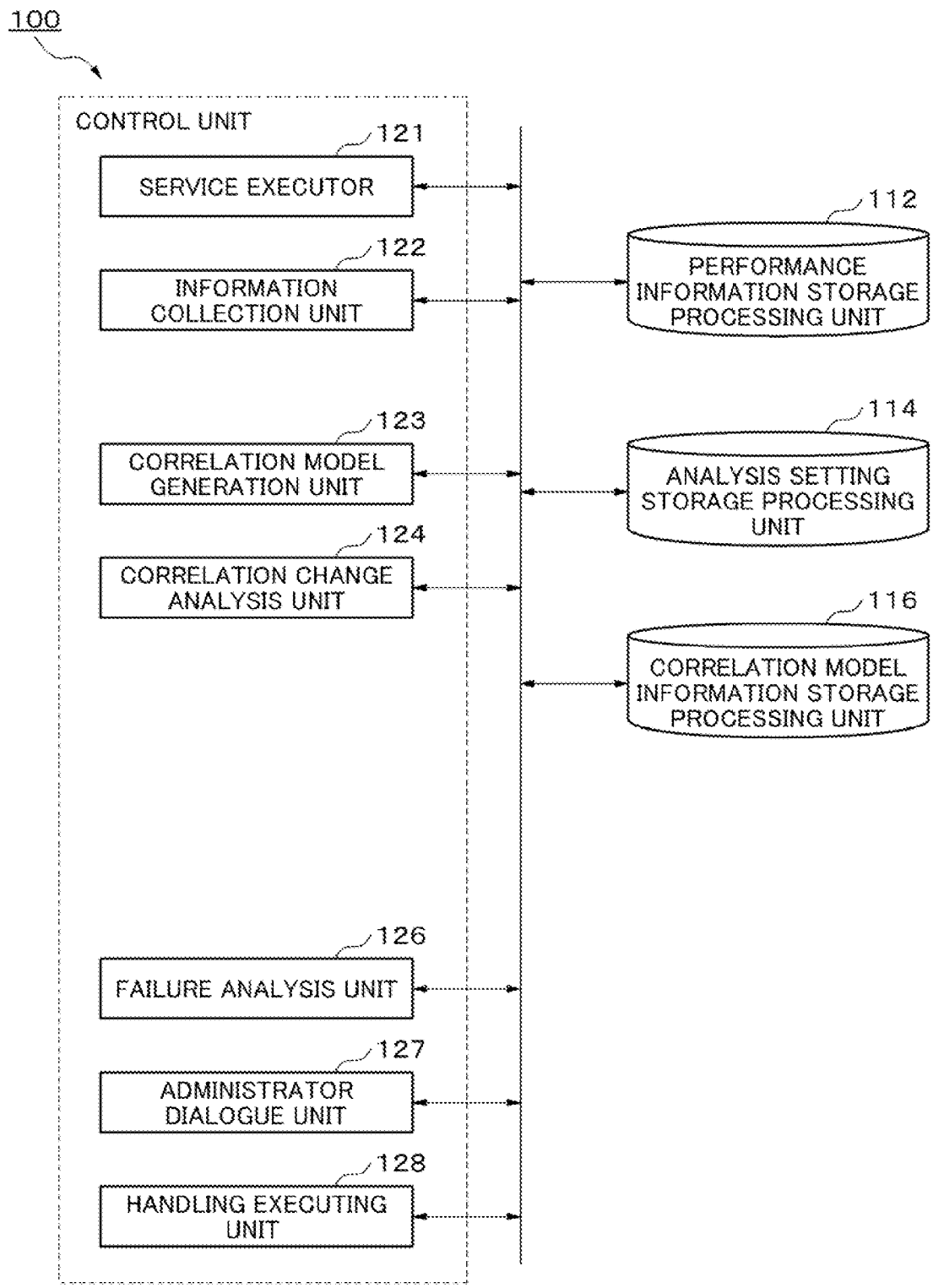
FIG. 5 is another exemplary block diagram of the entire structure of an operations management apparatus of the first exemplary embodiment.

FIG. 5 is another exemplary block diagram of the entire structure of the operations management apparatus of the first exemplary embodiment. As shown in FIG. 5, each unit of operations management apparatus 100 may include a plurality of functions of a control unit.

Correlation change analysis unit 124 may calculate a predicted value of the second element based on the first element of the performance information acquired newly which has not been used for generation of the correlation model and the correlation function, calculate a prediction error by comparing a value of the second element of the performance information acquired newly which has not been used for generation of the correlation model with the predicted value of the second element, and analyze whether the prediction error is in a predetermined error range.

Correlation change analysis unit 124 also may determine that a correlation between the first element and the second element is destroyed, when the prediction error is out of the error range, and calculate an abnormal score of the first element and the second element.

Further, correlation change analysis unit 124 may performs control to indicate each of the elements being sequenced based on the abnormal score.

(Correlation Model Generation)

Figure 6:
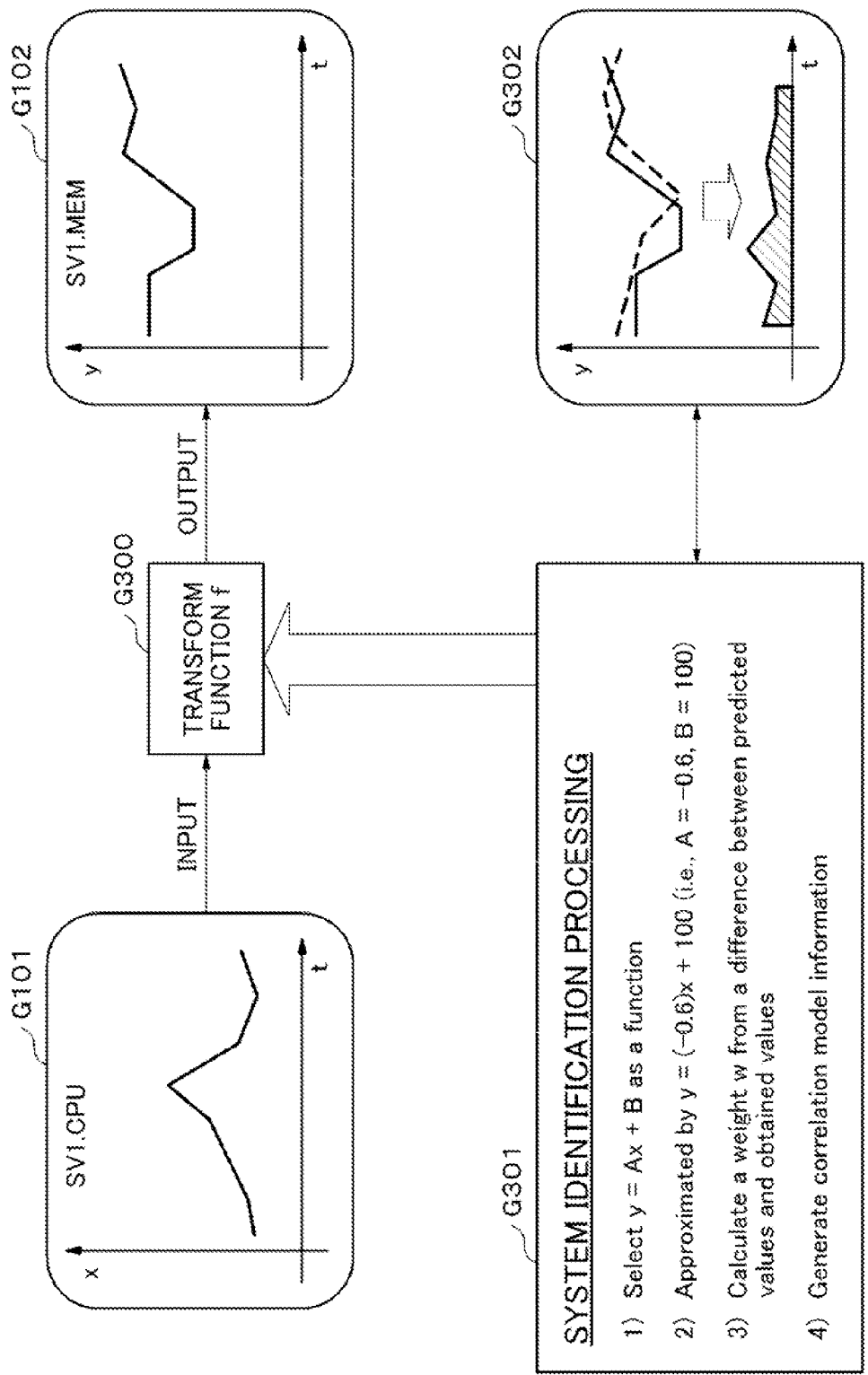
FIG. 6 is an exemplary diagram of transform function identification in an operations management apparatus of the first exemplary embodiment.

Here, the outline of correlation model generation by correlation model generation unit 123 will be described with reference to FIG. 6. FIG. 6 is an exemplary diagram of transform function identification in an operations management apparatus of the first exemplary embodiment.

Figure 12:
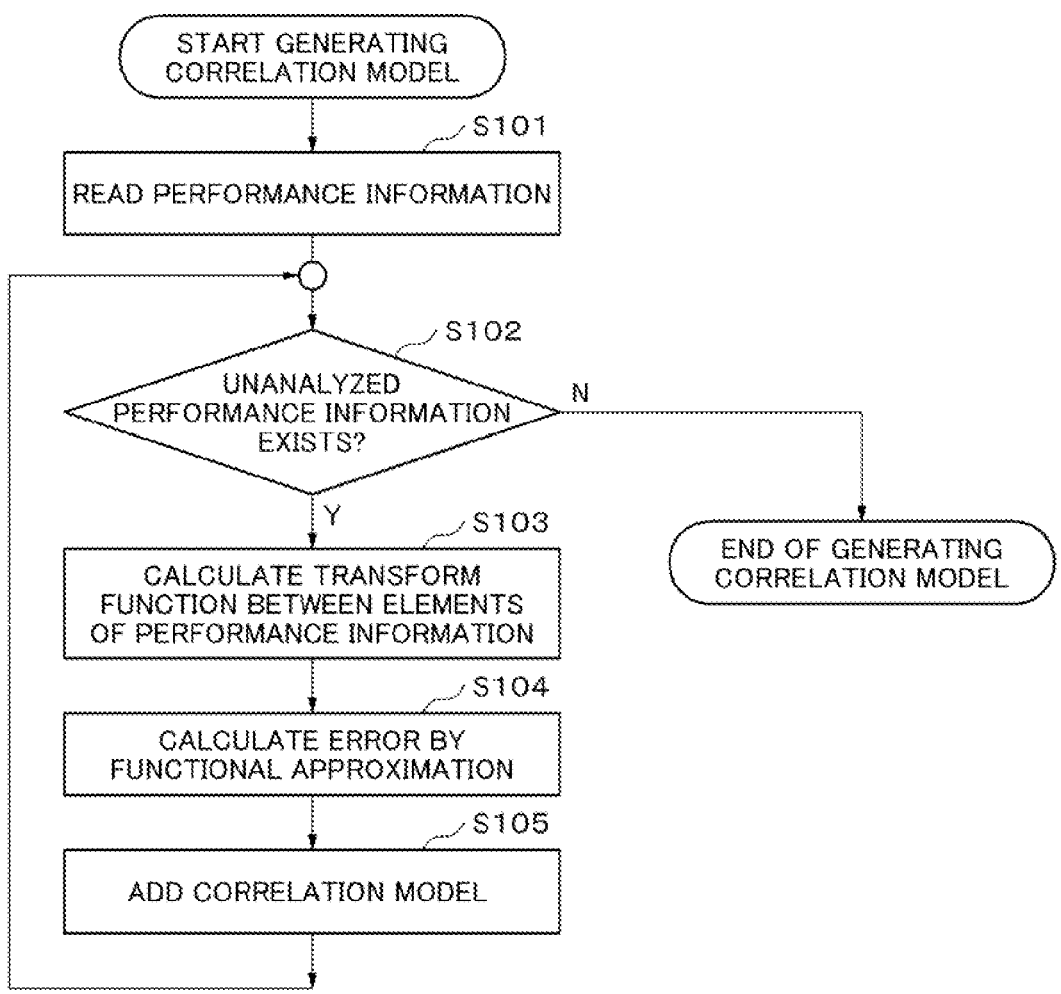
FIG. 12 is an exemplary flowchart of a detailed processing procedure of correlation model generation in an operations management apparatus of the first exemplary embodiment.

Generation of a correlation function can be performed by processing of Step S103 (a correlation function generation function) shown in FIG. 12 to generate a correlation function (transform function) and Step S104 (a weight calculation function) to calculate an error.

As shown in FIG. 6, transform function G300 takes a series of the values of SV1-CPU indicated in graph G101 (a first series of performance information) as input, and outputs a series of the values of SV1-MEM indicated in graph G102 (a second series of performance information).

Correlation model generation unit 123 calculates this transform function G300 by system identification processing G301.

For example, correlation model generation unit 123 calculates A=−0.6 and B=100 for a transform function indicated by a formula of y=Ax+B.

As indicated in graph G302, correlation model generation unit 123 generates a weight w from a difference between the series of predicted values of an element of performance information generated from graph G101 using this transform function and a series of values of the element of performance information detected actually as indicated in graph G102.

Here, weight w may be defined as value 0-1 representing the magnitude of a difference (prediction error) between a series of values of an element predicted by this transform function and a series of values detected actually, for example. In this case, the larger the difference (prediction error) is, the smaller weight w is, and the smaller the difference (prediction error) is the larger weight w is. In this case, weight w may be a value corresponding to a percentage of a predicted value which is matched with a detected value, and it may be 1 when a series of predicted values and a series of detected values are identical completely, and 0 when they are not identical at all. Alternatively, weight w may be a value which includes the degree of a difference when a predicted value is not identical with a detected value.

FIG. 7 is an exemplary diagram of a data structure of a correlation model in an operations management apparatus of the first exemplary embodiment. Correlation model 116a includes the name of an element of performance information which is assigned as input of a transform function, the name of an element of performance information assigned as output of a transform function, a value of each coefficient that specifies a transform function, a weight and correlation determination information which indicates whether a correlation is effective or invalid. For example, when the transform function is y=Ax+B as shown in FIG. 6, the value −0.6 of coefficient A, the value 100 of the coefficient B and the weight 0.88 are stored for SV1-CPU and SV1-MEM. The correlation is effective, meaning that a correlation has not been destroyed and is kept.

(Correlation Change Analysis)

Figure 9:
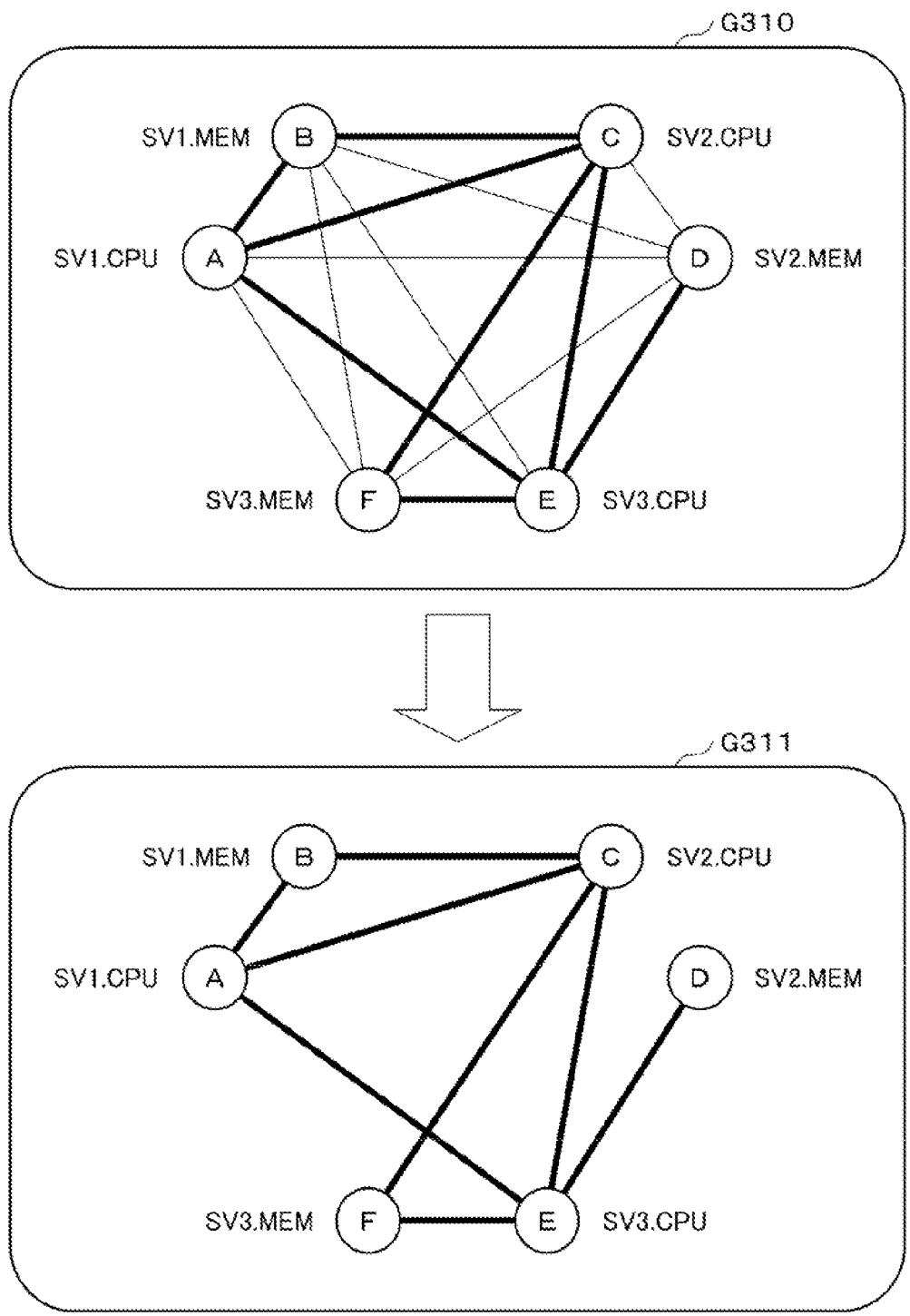
FIG. 9 is an exemplary diagram of a correlation model selection in an operations management apparatus of the first exemplary embodiment.

The outline of correlation change analysis by correlation change analysis unit 124 will be described with reference to FIG. 9. FIG. 9 is an exemplary diagram of correlation model selection in an operations management apparatus of the first exemplary embodiment.

Correlation graph G310 in FIG. 9 is an example of correlation models in correlation model information storage processing unit 116. In FIG. 9, a CPU utilization rate and remaining memory capacity of three servers SV1, SV2 and SV3 are expressed as elements A-F of performance information respectively.

For example, element A, SV1-CPU, means that it is the CPU utilization rate of the first server. Element D, SV2.MEM, means that it is the remaining memory capacity of the second server.

A line which connects between respective elements indicates a correlation expressed by a transform function of a correlation model. For a correlation having a weight represented by the range 0-1 of 0.5 or more, the correlation is indicated by a heavy line, and for a correlation besides those by a thin line.

For example, a correlation between element A and element B is a heavy line, meaning that the weight of the correlation model is no smaller than 0.5. A correlation between element A and element F is a thin line, meaning that weight information on the correlation model is less than 0.5.

Because the weight is calculated according to an error of a transform function, the thickness of these lines represents the strength of the correlation. Correlation change analysis unit 124 extracts only stable correlations for which a weight is no smaller than 0.5 from correlation graph G310 and obtains a correlation such as correlation model G311, for example.

Figure 10:
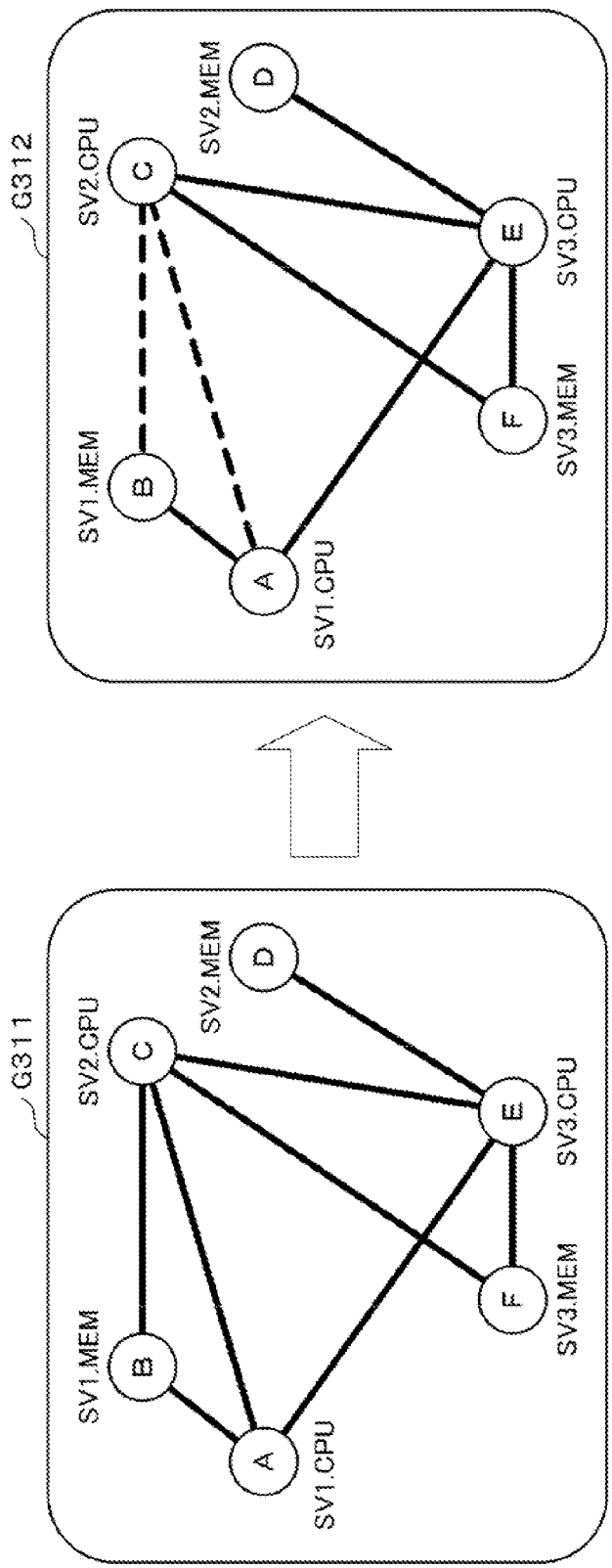
FIG. 10 is an exemplary diagram of correlation change detection in an operations management apparatus of the first exemplary embodiment.

FIG. 10 is an exemplary diagram of correlation change detection in an operations management apparatus of the first exemplary embodiment. FIG. 10 is an explanation drawing showing an example of the state in which a correlation has been destroyed when performance information is detected newly in an operations management apparatus according to the exemplary embodiment. In correlation graph G312 shown in FIG. 10, correlations between element A and element C, and element B and element C among correlations indicated in correlation graph G311 have been destroyed (it is indicated by a dotted line).

(Processing Procedure)
(Overall Processing)

Next, processing of each unit in an operations management apparatus including the above-mentioned configurations may be also realizable as a method, thus various processing procedures as a data processing method will be described with reference to FIGS. 11 to 13.

Figure 11:
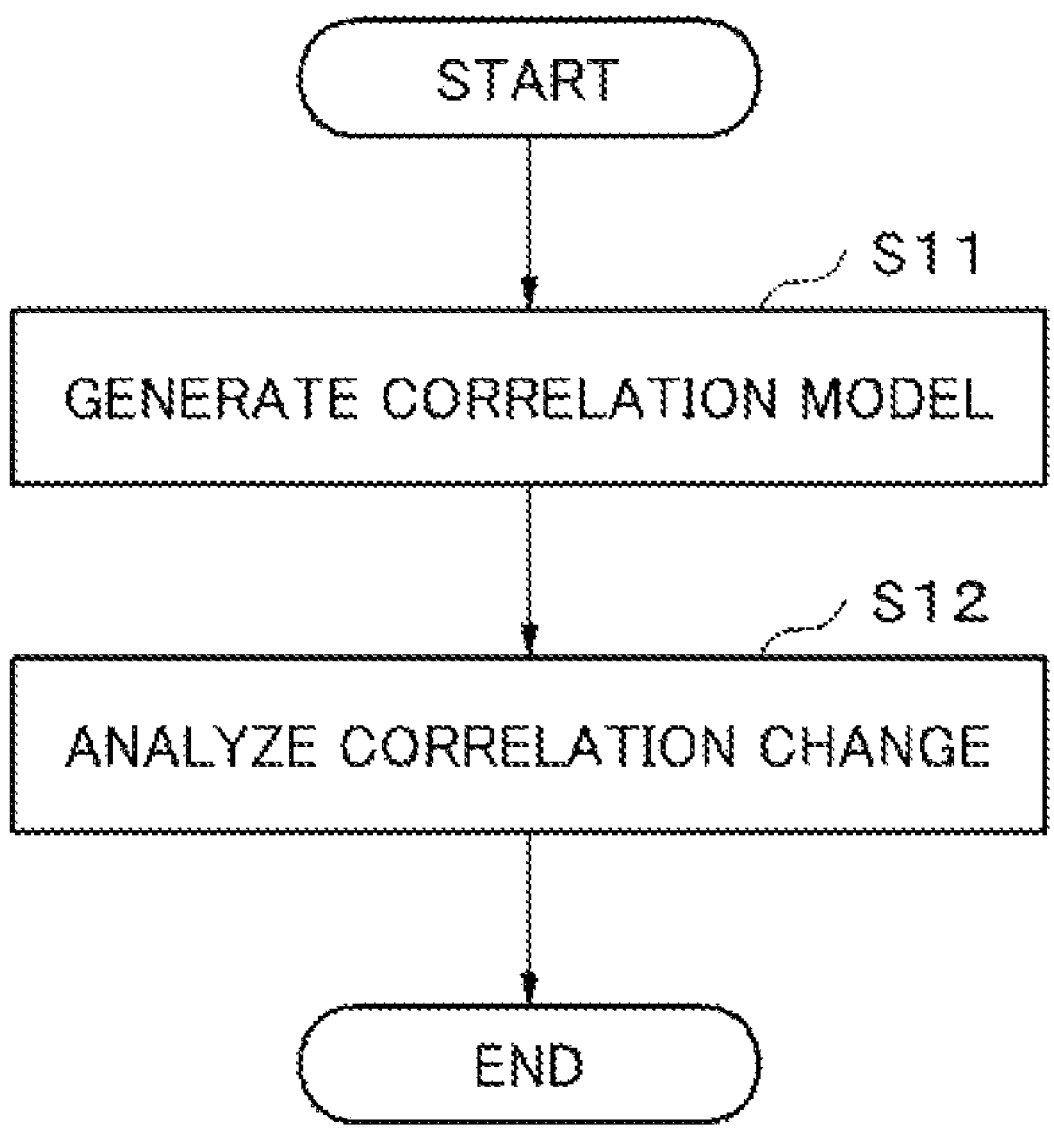
FIG. 11 is an exemplary flowchart showing an example of the overall processing procedure in an operations management apparatus of the first exemplary embodiment.

FIG. 11 is an exemplary flowchart showing an example of the overall processing procedure in an operations management apparatus of the first exemplary embodiment.

A data processing method of the exemplary embodiment performs information processing to acquire performance information for each of a plurality of performance items from a plurality of controlled units to manage operation of the controlled unit.

This data processing method may include, as basic configuration, obtaining a correlation model for each element pair of performance information by deriving, when the performance items or the controlled units are designated as an element of the performance information, a correlation function between a first series of performance information that indicates time series variation about a first element and a second series of performance information that indicates time series variation about a second element, and generating the correlation model between the first element and the second element based on the correlation function (Step S11 shown in FIG. 11, for example); and analyzing a change in the correlation model based on the performance information acquired newly which has not been used for generation of the correlation model (Step S12 shown in FIG. 11, for example).

Hereinafter, detailed processing of the correlation model generation and correlation change analysis will be described.

(Detailed Processing of Correlation Model Generation)

FIG. 12 is an exemplary flowchart of the detailed processing procedure of the correlation model generation in an operations management apparatus of the first exemplary embodiment.

In the detailed processing of the correlation model generation in the first exemplary embodiment, first, information collection unit 122 collects an operation state of service executor 121 and accumulates performance information 12a shown in FIG. 3 in performance information storage processing unit 112.

Correlation model generation unit 123 reads performance information 12a from performance information storage processing unit 112 (Step S101 shown in FIG. 12).

Next, correlation model generation unit 123 determines presence or absence of an element of performance information which has not been analyzed yet (Step S102).

In a state that a correlation model is not generated, correlation model generation unit 123 moves to processing to calculate a transform function between elements of the performance information (Step S103), because there are elements of the performance information which have not been analyzed yet.

First, correlation model generation unit 123 calculates a transform function between a series of element SV1-CPU and a series of SV1-MEM of performance information 12a. In case of FIG. 6, correlation model generation unit 123 determines transform function G300 where SV1-CPU is set as input x and SV1-MEM as output y following system identification processing G301.

There are several techniques in such system identification. For example, using the formula $y=Ax(t)+Bx(t-1)+Cx(t-2)+Dy(t-1)+Ey(t-2)+F$, a value of variables A-F is determined so that values of time series of y calculated from x become closest to values of y detected actually.

Hereinafter, in order to simplify a description, a case where A and B of the formula $y=Ax+B$ are determined will be described. Even when other system identification methods are used, if a transform function that can calculate from a series of individual performance information of one element of performance information a series of individual performance information of another element of performance information is used, the similar effect is obtained.

In System identification processing G301 of FIG. 6, $y=Ax+B$ is selected as a function, and −0.6 and 100 are determined as a value of A and B respectively which can approximate graph G102 from graph G101 (Step S103 shown in FIG. 12).

As shown in graph G302, in system identification processing G301, a series of predicted values of SV1-MEM calculated using this transform function and a series of values of SV1-MEM detected actually (graph G102) are compared. System identification processing G301 then calculates a weight of the transform function from a difference between them (a conversion error) (Step S104 shown in FIG. 12) <that is, a weight calculation step or a weight calculation function>.

Correlation model generation unit 123 adds the calculated transform function and the weight to correlation models of correlation model information storage processing unit 116 (Step S105).

FIG. 7 is an example of a correlation model added in this way. As a correlation model between element SV1-CPU and SV1-MEM, the values of A, B and W are accumulated.

Subsequently, in the same way, by performing processing of Steps S103-S105 to all combinations of a sequence of each element included in performance information 12a, correlation models about current performance information of the system are established in correlation model storage processing unit 116.

Correlation models 116b of FIG. 8 is an example of a correlation model generated in this way, and transform functions about SV3-CPU and SV2-CPU are added in addition to items in correlation model 116a of FIG. 7.

(Detailed processing of correlation change analysis)

Next, the detailed processing of correlation change analysis in the present exemplary embodiment will be described with reference to FIG. 13, FIG. 9 and FIG. 10. FIG. 13 is an exemplary flowchart of a detailed processing procedure of the correlation change analysis in an operations management apparatus of the first exemplary embodiment.

Figure 13:
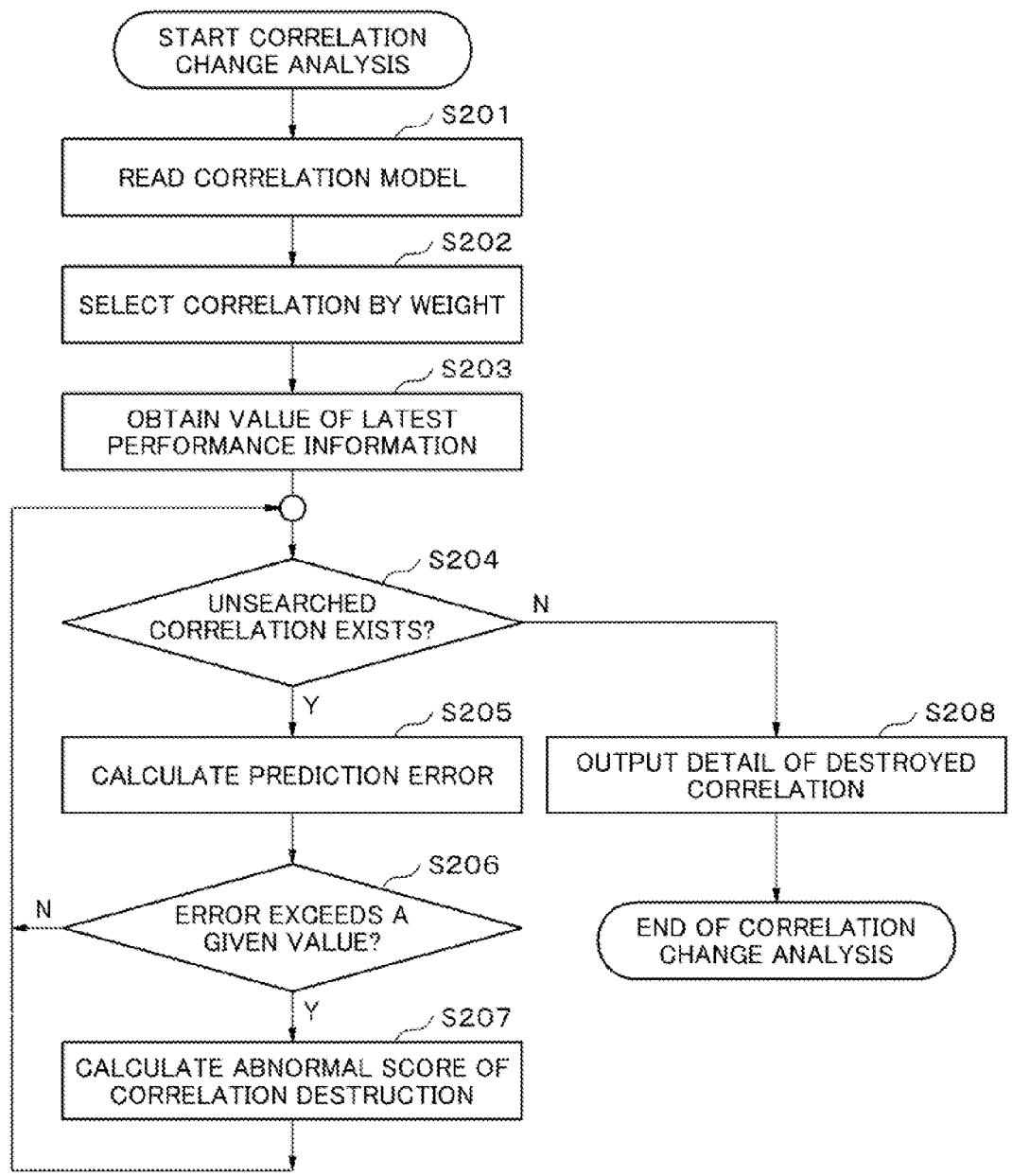
FIG. 13 is an exemplary flowchart of the detailed processing procedure of correlation change analysis in an operations management apparatus of the first exemplary embodiment.

First, as shown in FIG. 13, correlation change analysis unit 124 reads a correlation model from correlation model information storage processing unit 116 (Step S201 shown in FIG. 13) and selects the correlation by the weight included in the correlation model (Step S202).

Correlation graph G310 of FIG. 9 is an example of correlation models in correlation model information storage processing unit 116. In FIG. 9, a CPU utilization rate and remaining memory capacity of three servers SV, SV2 and SV3 is expressed as elements A-F of performance information respectively.

Lines connecting between the respective elements indicate a correlation expressed by a transform function of a correlation model. For a correlation having a weight represented by the range 0-1 of 0.5 or more, the correlation is indicated by a heavy line, and for a correlation besides those by a thin line.

The thickness of these lines represents the strength of the correlation, because a weight is calculated by an error of a transform function. Correlation change analysis unit 124 extracts only a stable correlation in which the weight is no smaller than 0.5 from correlation graph G310 and obtains a correlation like correlation model G311, for example.

In correlation graph G312 shown in FIG. 10, correlations between element A and element C, and element B and element C among correlations indicated in correlation graph G311 have been destroyed (it is indicated by a dotted line).

Next, correlation change analysis unit 124 obtains performance information acquired newly which has not been used for generation of a correlation model from information collection unit 122 (Step S203).

For example, in performance information 12a of FIG. 3, when performance information as of Nov. 7, 2007 8:31 shown in the lowest line of the list has been obtained as new performance information, correlation change analysis unit 124 searches transform functions described in correlation models 116b shown in FIG. 8 successively.

That is, correlation change analysis unit 124 performs determination processing of whether there is a correlation model which has not been searched (Step S204). In this determination processing, when being determined that there is no correlation model which has not been searched, correlation change analysis unit 124 advances towards Step S208, and outputs details of destroyed correlation.

On the other hand, in this determination processing, when being determined that there is a correlation model which has not been searched, correlation change analysis unit 124 advances towards Step S205, selects a correlation model among correlation models which have not been searched; using the value of an element of the performance information acquired newly and the correlation function of the correlation model, predicts a value of the other element; and calculates a prediction error of the other element (Step S205).

For example, correlation change analysis unit 124 calculates the correlation function $(-0.6)*(20)+100$ for the detected value 20 of SV1-CPU acquired newly, and calculates a predicted value 88 of the other element SV1-MEM. Correlation change analysis unit 124 obtains the error 9 by comparing the predicted value 88 and the detected value 79 of element SV1-MEM.

Next, correlation change analysis unit 124 calculates the proportion that this prediction error occupies in the detected value. Then, correlation change analysis unit 124 determines whether the prediction error exceeds a given value determined in advance (whether it is within a predetermined given range) (Step S206).

In this determination processing, when being determined that this prediction error does not exceed the predetermined value, correlation change analysis unit 124 returns to Step S204 and repeats processing after this step.

On the other hand, in this determination processing, when being determined that this prediction error exceeds the predetermined value, correlation change analysis unit 124 advances towards Step S207, calculates an abnormal score of the correlation destruction and returns to Step S204.

For example, in Step S206, in case a prediction error does not exceed threshold value of 20% which has been decided in advance, it is deemed that the correlation is kept, and correlation change analysis unit 124 returns to Step S204.

In the same way, when correlation change analysis unit 124 calculates a prediction error between SV1-CPU and SV2-CPU (Step S205), and detects that the value exceeds 20% (Step S206), correlation change analysis unit 124 determines that there is correlation destruction and calculates an abnormal score of the respective elements (Step S207).

Here, the abnormal score is a value that indicates the degree of abnormality of an element for which correlation destruction has been detected. For example, the abnormal score may be defined as, regarding the number of connections between an element and a correlation for which relation has been destroyed, a proportion that the number of connections of each element occupies in the number of all connections in the correlation model. In this case, an abnormal score can be defined as (the number of connections between an element and a correlation for which relation has been destroyed)/(2× the number of destroyed correlations).

Henceforth, correlation change analysis unit 124 searches all correlations successively (Step S204) and outputs a result of the analysis including a list of destroyed correlations and an abnormal score to failure analysis unit 126 (Step S208).

FIG. 10 indicates a state of correlation destruction detected in this way. In correlation graph G312, correlations between element A and element C, and element B and element C among correlations indicated in correlation graph G311 are destroyed (they are indicated by dotted lines).

Failure analysis unit 126 receives such a result and shows it to an administrator along with a result of other failure analyses.

Figure 14:
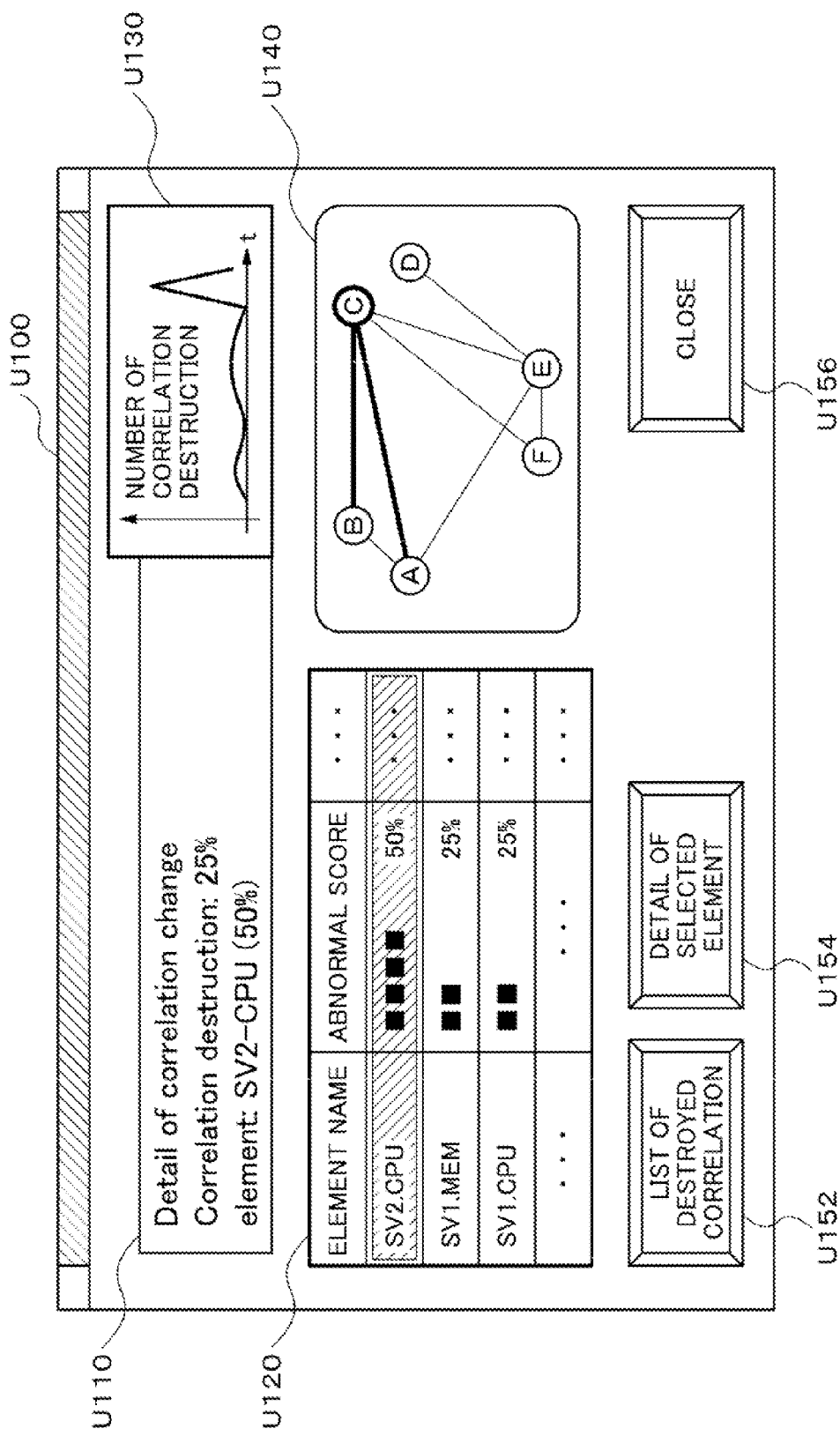
FIG. 14 is an exemplary diagram of an indicated display screen in an operations management apparatus of the first exemplary embodiment.

As a display screen which indicates a result of such correlation change analysis, something shown in FIG. 14 may be used, for example. FIG. 14 is an exemplary diagram of an indicated display screen in an operations management apparatus of the first exemplary embodiment. In this diagram, an example of a display screen (correlation change analysis result screen) in correlation change analysis is indicated.

As shown in FIG. 14, display screen U100 (correlation change analysis result screen) shown on a display unit includes a correlation graph display portion U140 which indicates a correlation graph. Correlation graph display portion U140 may indicate a state and a transfer situation of a correlation graph shown in FIG. 9 and FIG. 10 described above. In this example, correlation destruction is indicated by a heavy straight line and an element having a high abnormal score is indicated by a circle with a heavy line.

Display screen U100 further includes abnormal score element list display portion U120 which lists elements having a high abnormal score in turn. Abnormal score element list display portion U120 may indicate the amount of an abnormal score of an element (performance item) and other information of the element.

Display screen U100 includes analysis result display portion U110 on which a correlation change analysis result such as a proportion of correlation destruction in the correlation graph of correlation graph display portion U140 and an element with the largest abnormal score among elements of the abnormal score element list of abnormal score element list display portion U120 are displayed.

Display screen U100 also includes the-number-of-correlation-destruction change graphic display portion U130 which graphs and indicates an aging change of the number of correlation destruction.

Display screen U100 includes first display operating portion U152 indicating a list of a destroyed correlation. Display screen U100 includes second display operating portion U154 indicating detailed information on a selected element. Display screen U100 includes third display operating portion U156 ending displaying of the correlation change analysis result screen.

In FIG. 14, two correlations related to element C (SV2-CPU) among eight indicated correlations on correlation graph G311 are destroyed, and the proportion of the correlation destruction is 25%. The number of connections of elements A (SV1-CPU), B (SV1-MEM) and C with the destroyed correlations are 1, 1 and 2, respectively, and the sum of the number of these connections will be 4. Accordingly, an abnormal score of elements A, B and C will be 25%, 25% and 50% respectively.

As shown in FIG. 14, analysis result display portion U110 of display screen U100 shows that the proportion of the correlation destruction is 25% and the element with the largest abnormal score is element C, as a result of the correlation change analysis. Abnormal score element list display portion U120 of display screen U100 shows that an abnormal score of element C, SV2-CPU, has become high in the sequenced list of abnormal scores.

An administrator refers to this result and can learn that abnormality occurs in a value of an element of performance information and that is caused by SV2-CPU.

By the above mentioned Steps S201 to S208, an operations management apparatus can perform the correlation change analysis step.

In the correlation change analysis step, a value of the second element is predicted based on the first element of the performance information acquired newly which has not been used for generation of the correlation model and the correlation function, a prediction error by comparing a value of the second element of the performance information acquired newly which has not been used for generation of the correlation model with the predicted value of the second element is calculated, and whether the prediction error is in a predetermined error range is analyzed.

In the correlation change analysis step, when the prediction error is outside the error range, determination that the correlation between the first element and the second element has been destroyed is made, and an abnormal score of the first element and the second element is calculated.

Further, in the correlation change analysis step, based on the abnormal score, the elements are presented being sequenced.

According to the first exemplary embodiment, correlation Model generation unit generates a correlation model by deriving a transform function for time series of values of two elements of performance information when making one element input and making the other output as discussed above.

When correlation change analysis unit acquires new performance information which has not been used for generation of a correlation model, it determines whether the value of each element of the performance information conforms with the transform function of a generated correlation model, and then outputs information including the number and the amount of collapsed correlations to a failure analysis unit. Thus, in the present exemplary embodiment, the occurring place of an abnormality can be identified according to whether a correlation learned at normal times has collapsed or not.

As a result, compared with threshold monitoring of performance information of related technology, the first exemplary embodiment has the effect that it can detect a performance abnormality such as response degradation correctly and specify the occurring place of the abnormality.

Also, in comparison with a method of related technology which calculates a correlation of performance information at the time of an abnormality, the first exemplary embodiment has the effect that it is able to indicate relation when being normal and relation when being abnormal distinctively.

Further, the first exemplary embodiment can reduce administrator's burden and prevent increase of an amount of processing of a system, because data for knowledge does not need to be prepared in advance for these analyses, and thus a processing history or the like besides the performance information does not need to be collected.

In related technology, because a model is being generated as a time variation function of one of performance information item, it is determined whether the value of the one of performance information item is same as the value predicted last time.

In contrast, the first exemplary embodiment can determine whether relation of the values of two performance information items is kept by generating a model as a transform function between the two performance information items.

In related technology, although a correlation rule between two performance information items is used, it is not described at all how to generate this rule, and there is a problem that burdens of rule generation to find a singular point is heavy.

Also, in related technology, although a value of a coefficient of correlation is calculated, a transform function between two elements of performance information is not calculated. The characteristic of a method to derive a transform function is different from other analytical methods. In related technology, although it can derive to which model prepared in advance a result of the calculation is similar, a method to decide the contents of a model prepared is unexplained.

In contrast, in the first exemplary embodiment, as shown in FIG. 9, a model with fewer false reports can be generated by extracting a strong correlation. In the first exemplary embodiment, ranking of the degree of abnormality of each element and an element which is abnormal can be illustrated as shown in FIG. 14 by analyzing from a transform function of 1 to 1.

Here, by a computer executing various programs stored in a suitable memory, some of blocks in the block diagram shown in FIG. 4 (such as blocks indicated by the symbols 123, 124, 121, 122, 126, 127 and 128, for example) may be a software module which indicates a state functionalized by the program.

That is, although the physical composition of the first exemplary embodiment is of one or more CPUs (or, one or more CPUs and one or more memories) or the like, for example, software structure by each unit (circuit and means) expresses a plurality of functions that CPU exhibits under control of a program as a component by a plurality of units (means) respectively.

When a dynamic state where the CPU is operated by a program (a state where each procedure configuring the program is being executed) is expressed functionally, it can be considered that each part (means) is structured inside the CPU. In a static state where the program is not being executed, an entire program for enabling structuring of each means (or each program part included in the structure of each means) are stored in a storage area such as a memory.

It is naturally understood that the explanations of each unit (means) provided above is understood as describing a computer functionalized by programs along with the functions of the programs, or as describing an apparatus includes a plurality of electronic circuit blocks that are functionalized permanently with specific hardware. Therefore, those functional blocks can be achieved in various kinds of forms such as only with hardware, only with software, or combination of those, and it is not intended to be limited to any one of those.

Each unit may be configured as a device including a dedicated computer which can communicate, and an operations management system may be configured by these devices.

Second Exemplary Embodiment

Figure 15:
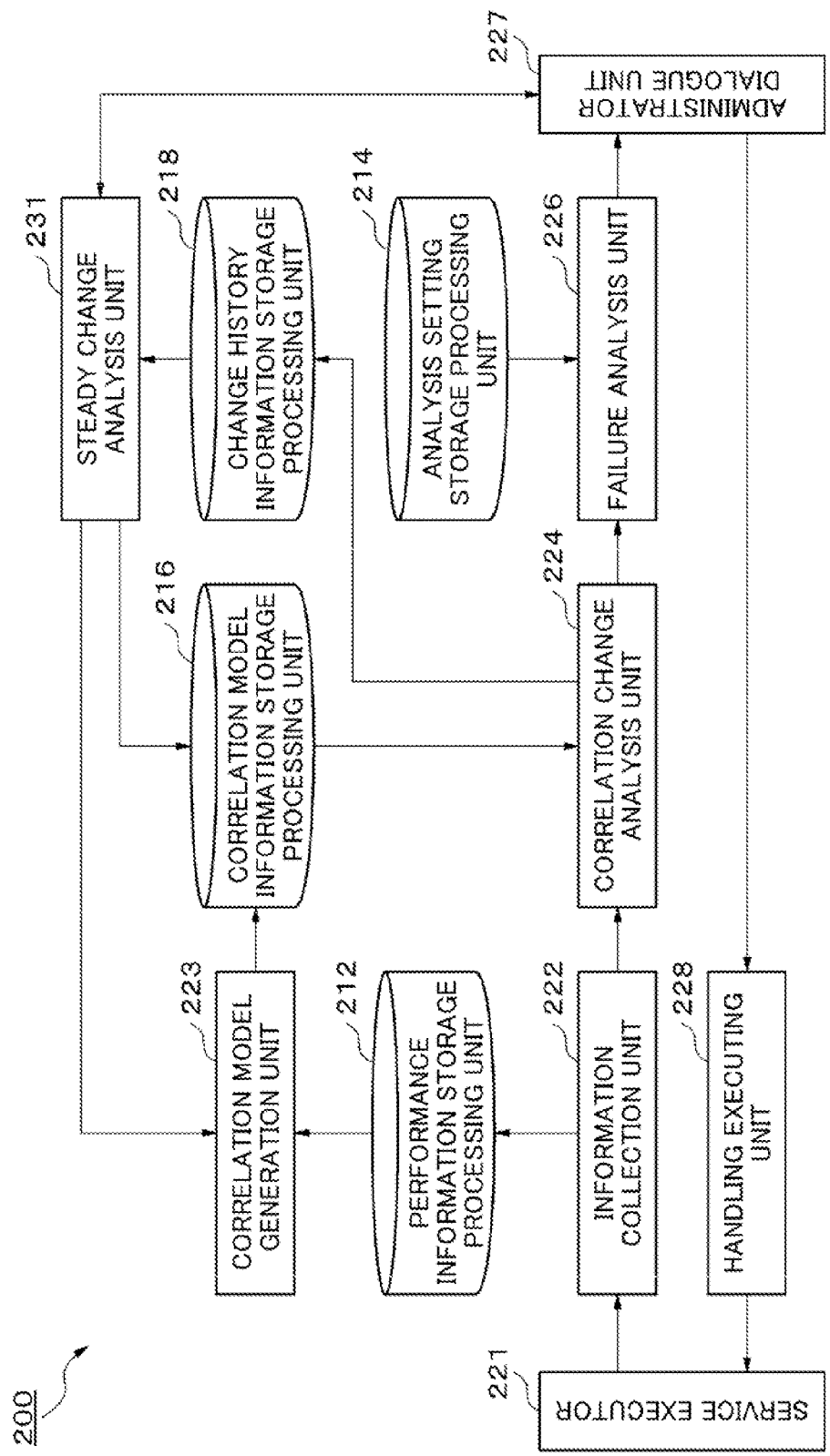
FIG. 15 is an exemplary block diagram of the entire structure of an operations management apparatus of a second exemplary embodiment.

Next, a second exemplary embodiment will be described based on FIG. 15. In the following description, configuration substantially similar to the first exemplary embodiment will be skipped, and only a different part is stated. FIG. 15 is an exemplary block diagram of the entire structure of an operations management apparatus of the second exemplary embodiment.

The configuration in the second exemplary embodiment includes a change history information storage processing unit 218 and a steady change analysis unit 231 in addition to the configuration described using FIG. 4 of the first exemplary embodiment.

As shown in FIG. 15, operations management apparatus 200 of the second exemplary embodiment includes change history information storage processing unit 218 and steady change analysis unit 231 in addition to service executor 221, a performance information storage processing unit 212, information collection unit 222, analysis setting storage processing unit 214, failure analysis unit 226, administrator dialogue unit 227, handle executing unit 228, correlation model generation unit 223, correlation model information storage processing unit 216 and correlation change analysis unit 224 which are the compositions of the first exemplary embodiment.

Change history information storage processing unit 218 accumulates history information on a correlation change analyzed by correlation change analysis unit 224.

Steady change analysis unit 231 reads a history of correlation destruction from change history information storage processing unit 218, and when finding a correlation destroyed continuously for a certain period, disables the corresponding correlation of correlation models accumulated in correlation model information storage processing unit 216.

When disabled correlations reach a given proportion, steady change analysis unit 231 directs correlation model generation unit 223 to re-generate correlation models.

Figure 16:
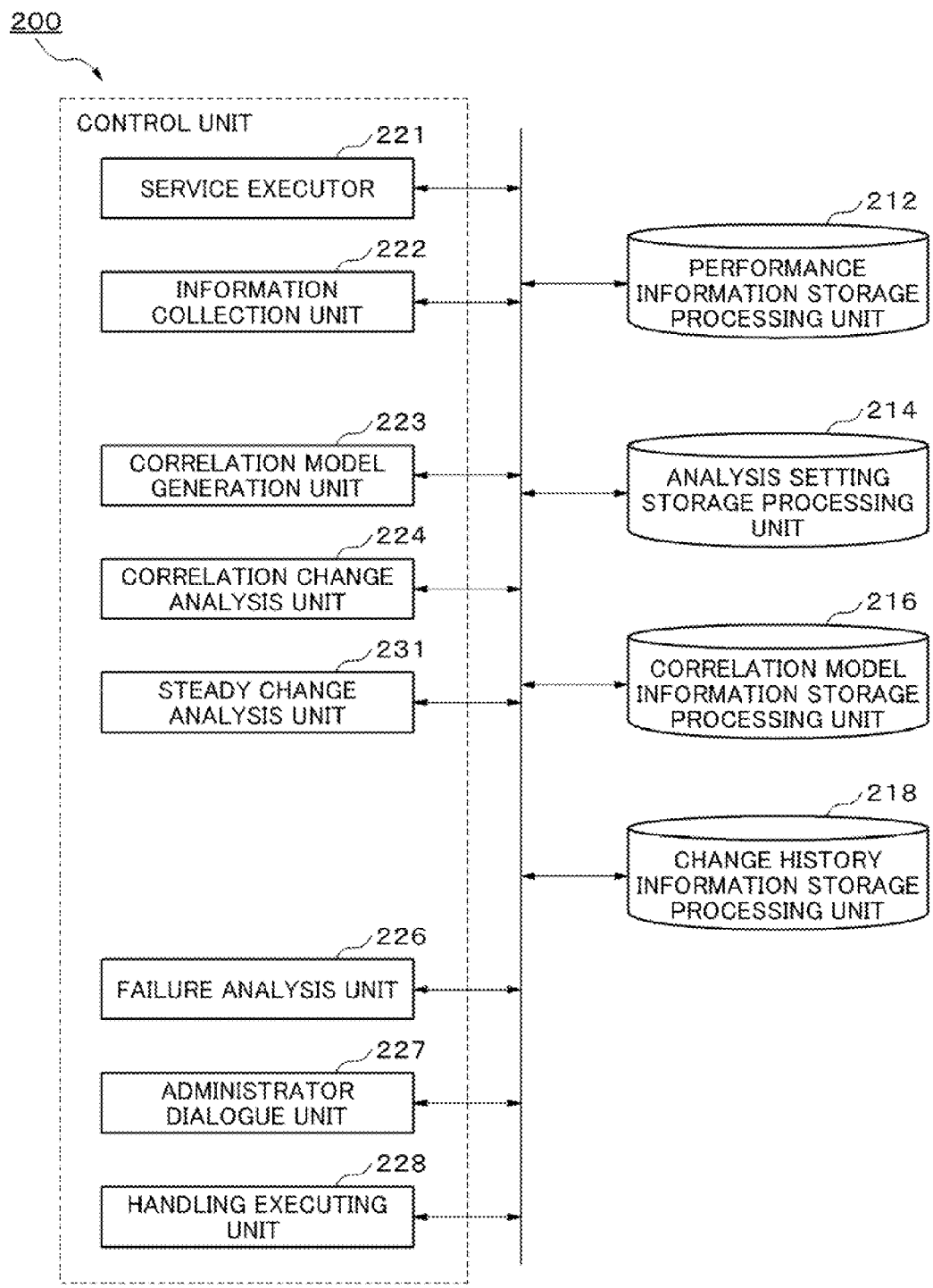
FIG. 16 is another exemplary block diagram of the entire structure of an operations management apparatus of the second exemplary embodiment.

FIG. 16 is another exemplary block diagram of the entire structure of an operations management apparatus of the second exemplary embodiment. As shown in FIG. 16, each unit of operations 20, management apparatus 200 may include a plurality of functions of a control unit.

Steady change analysis unit 231 may analyze whether a correlation of a correlation model is destroyed steadily.

Above-mentioned steady change analysis unit 231 may disable the correlation model, the correlation of which is destroyed steadily.

Steady change analysis unit 231 may direct the correlation model generation unit to re-generate correlation models, when a proportion that correlation models which have been disabled occupy in all correlation models exceeds a predetermined value.

Steady change analysis unit 231 may perform control to indicate necessity of re-generation of the correlation models, when a proportion that correlation models which have been disabled occupy in all correlation models exceeds a predetermined value.

(Correlation Destruction in Steadiness Analysis)

Figure 17:
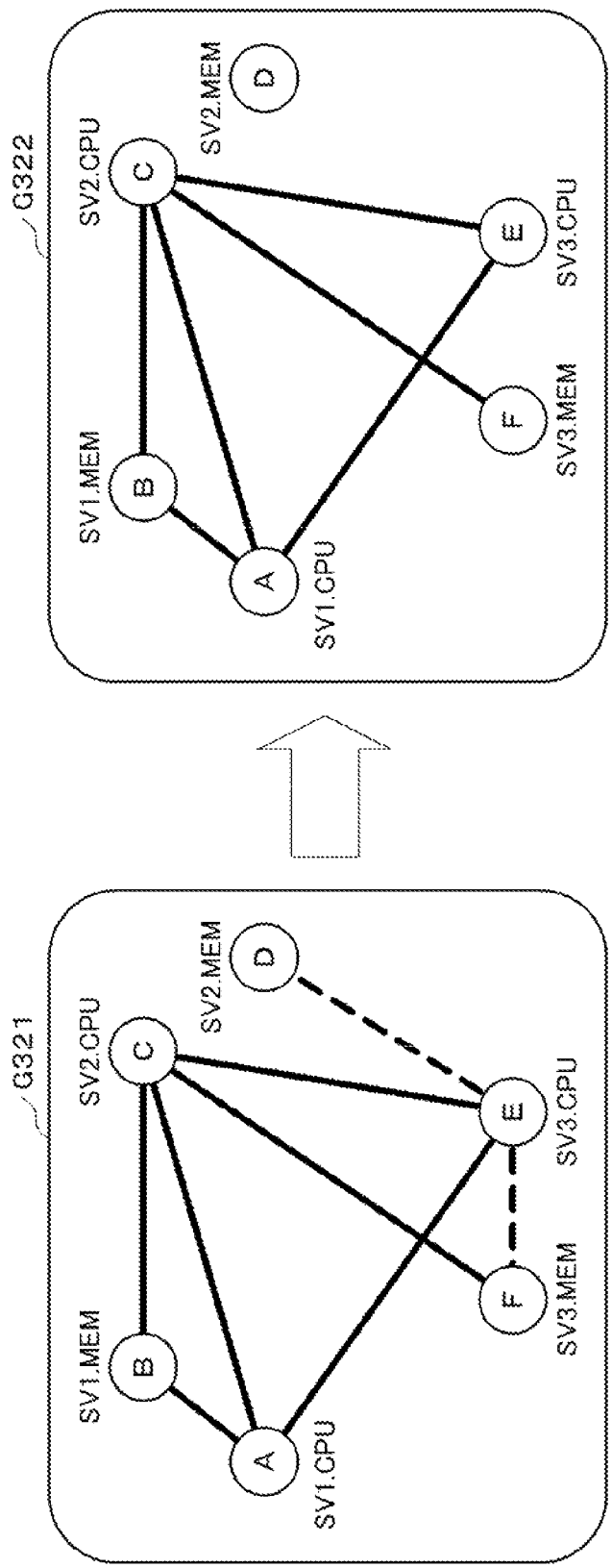
FIG. 17 is an exemplary diagram of correlation model disabling in an operations management apparatus of the second exemplary embodiment.

Here, the outline of correlation destruction in steadiness analysis by steady change analysis unit 231 will be described with reference to FIG. 17. FIG. 17 is an exemplary diagram of correlation model disabling in an operations management apparatus of the second exemplary embodiment. FIG. 17 is an explanation drawing showing an example of the outline of correlation destruction in steadiness analysis of an operations management apparatus according to the present exemplary embodiment.

As shown in FIG. 17, in correlation graph G321, correlations between element D (SV2-MEM) and element E (SV3-CPU), and element E (SV3-CPU) and element F (SV3-MEM) are destroyed steadily (it is indicated by a dotted line).

Figures 18, 19:
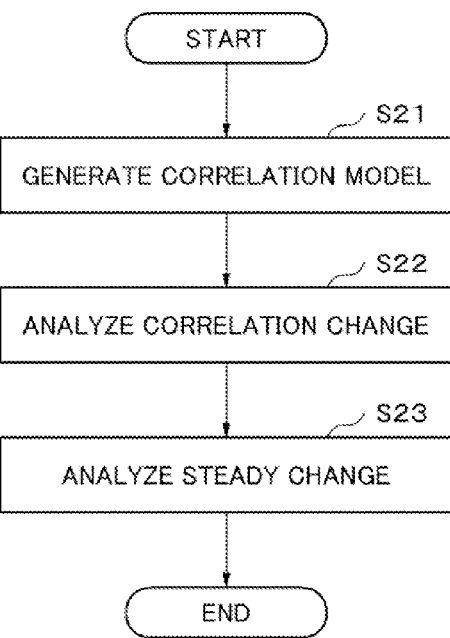
FIG. 18 is an exemplary diagram of a data structure of a correlation model in an operations management apparatus of the second exemplary embodiment.
FIG. 19 is an exemplary flowchart of the overall processing procedure in an operations management apparatus of the second exemplary embodiment.

FIG. 18 is an exemplary diagram of a data structure of correlation models in an operations management apparatus of the second exemplary embodiment.

Steady change analysis unit 231 corrects correlation models 116*b* shown in FIG. 8 to correlation models 216*b* shown in FIG. 18 by changing the field of "Effective" of correlations between SV3-CPU and SV3-MEM, and SV3-CPU and SV2-MEM to x.

For example, a graph corresponding to these correlation models 216*b* will be graph G322 shown in FIG. 17.

After this, correlation change analysis unit 224 reads these correlation models, and prevents detecting these correlation destructions every time by analyzing only correlations which are not disabled.

(Processing Procedure)

Next, processing of each unit in an operations management apparatus including the above-mentioned configurations will be also realizable as a method, and thus various processing procedures as a data processing method will be described with reference to FIGS. 19 and 20. FIG. 19 is an exemplary flowchart of the overall processing procedure in an operations management apparatus of the second exemplary embodiment.

A data processing method of the exemplary embodiment performs information processing to acquire performance information for each of a plurality of performance items from a plurality of controlled units and to manage operation of the controlled unit.

This data processing method may include, as basic configuration, obtaining a correlation model for each element pair of performance information by deriving, when the performance items or the controlled units are designated as an element of the performance information, a correlation function between a first series of performance information that indicates time series variation about a first element and a second series of performance information that indicates time series variation about a second element, and generating the correlation model between the first element and the second element based on the correlation function (Step S21 shown in FIG. 19, for example); and analyzing a change in the correlation model based on the performance information acquired newly which has not been used for generation of the correlation model (Step S22 shown in a FIG. 19, for example).

The data processing method may further include analyzing whether the correlation of the correlation model is destroyed steadily (Step S23 shown in a FIG. 19, for example).

Here, only detailed processing of steady change analysis will be described below, because detailed processing of the correlation model generation and the correlation change analysis is same as ones described in the first exemplary embodiment.

(Detailed Processing of Steady Change Analysis)

Figure 20:
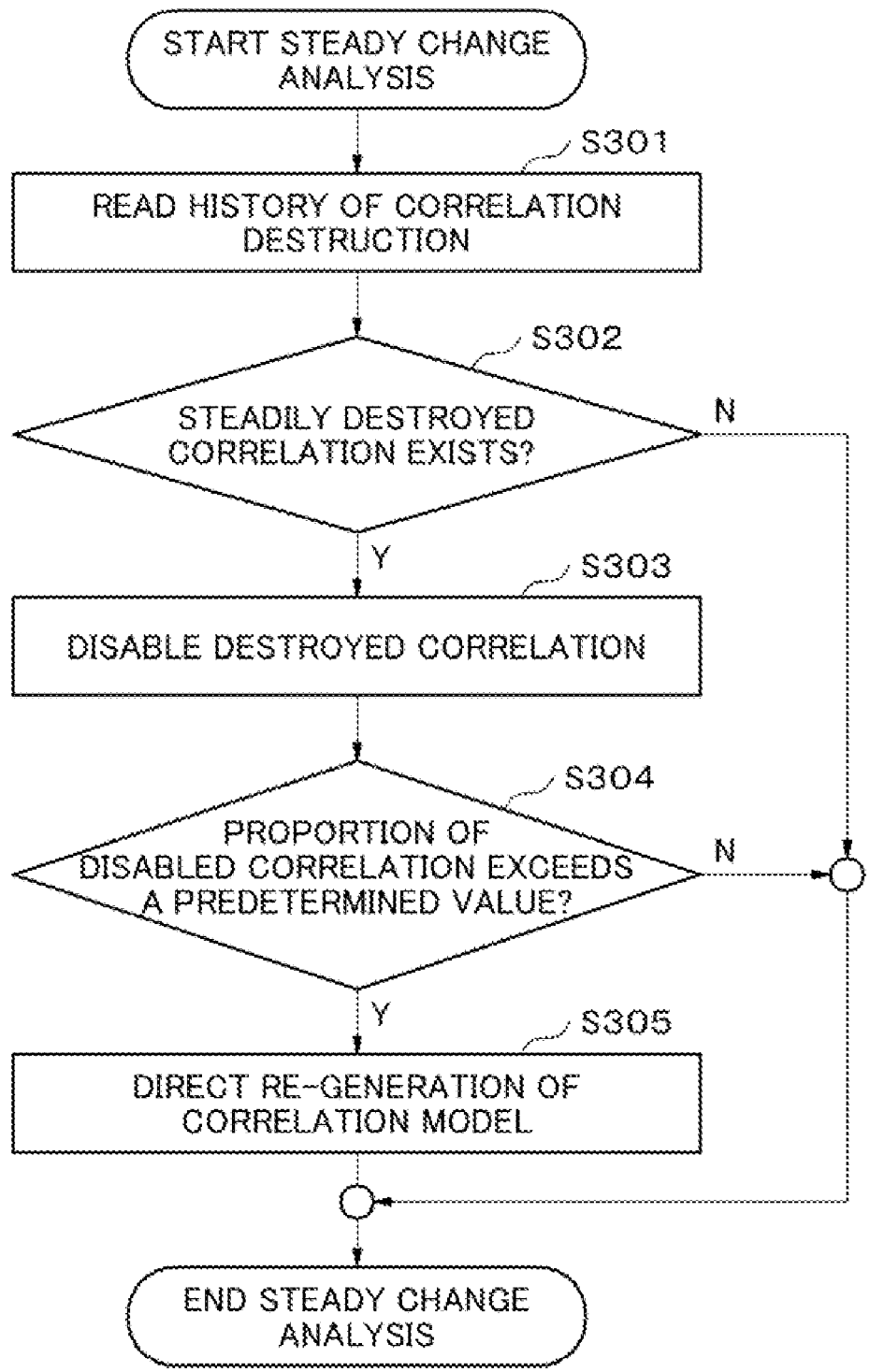
FIG. 20 is an exemplary flowchart of a detailed processing procedure of steady change analysis in an operations management apparatus of the second exemplary embodiment.

FIG. 20 is an exemplary flowchart of the detailed processing procedure of the steady change analysis in an operations management apparatus of the second exemplary embodiment.

When destruction of a correlation is detected, correlation change analysis unit 224 of the present exemplary embodiment accumulates a history thereof in change history information storage processing unit 218.

As shown in FIG. 20, steady change analysis unit 231 of a computer included in an operations management apparatus reads the history of this correlation destruction (Step S301).

Next, steady change analysis unit 231 performs determination processing of whether there is a correlation destroyed steadily (Step S302).

In this determination processing, when being determined that there is no correlation destroyed steadily, steady change analysis unit 231 finishes the processing.

On the other hand, in this determination processing, when being determined that there is a correlation destroyed steadily, steady change analysis unit 231 advances towards Step S303.

That is, when there is a correlation being destroyed continuously (Step S302), steady change analysis unit 231 disables the correlation being destroyed among correlation models accumulated in correlation model information storage processing unit 216 (Step S303).

FIG. 17 indicates an example of such correlation destruction. As shown in FIG. 17, in correlation graph G321, the correlations between element D and element E, and element E and element F are destroyed steadily (it is indicated by a dotted line).

Steady change analysis unit 231 corrects correlation models 116*b* shown in FIG. 8 to correlation models 216*b* shown in FIG. 18 by changing the field of "Effective" of correlations between SV3-CPU and SV3-MEM, and SV3-CPU and SV2-MEM to x.

As a result, a graph corresponding to these correlation models 216*b* will be graph G322 shown in FIG. 17, for example.

After this, correlation change analysis unit 224 reads these correlation models, and prevents detecting these correlation destructions every time by analyzing only correlations which are not disabled.

Steady change analysis unit 231 further performs determination processing of whether the proportion of the number of correlations disabled in this way in the correlation model is beyond a predetermined value decided in advance (Step S304).

In this determination processing, when being determined that the number of disabled correlations does not exceed the predetermined proportion, steady change analysis unit 231 finishes the processing.

On the other hand, in this determination processing, when being determined that the number of disabled correlations exceeds the predetermined proportion, steady change analysis unit 231 advances towards Step S305.

That is, when the number of correlations disabled in this way exceeds the predetermined proportion in the correlation model (Step S304), steady change analysis unit 231 directs correlation model generation unit 223 to re-generate correlation models (Step S305).

An example of an interactive screen when the number of disabled correlation models becomes large is shown in FIG. 21. FIG. 21 is an exemplary diagram of an indicated display screen in an operations management apparatus of the second exemplary embodiment. An example of a display screen displayed on a display unit of an operations management apparatus is shown in FIG. 21.

As shown in FIG. 21, display screen U200 (model re-generation screen) shown on a display unit includes a model related information display portion U220 which indicates model related information such as a model name, date-written, the number of correlations and steady destruction.

Display screen U200 includes display portion U210 which indicates a message related to a model generation. Display screen U200 includes first display operating portion U242 referring to a model. Display screen U200 includes second display operating portion U249 generating a model on a specific re-generation condition. Display screen U200 includes third display operating portion U246 ending displaying the model re-generation screen.

Thus, an administrator can learn that the correlation model which is being used for an analysis became unsuitable for the present operation situation by information from a system.

By the above mentioned Steps S301 to S305, an operations management apparatus may perform the steady change analysis step. In the steady change analysis step, the correlation model, the correlation of which is destroyed steadily, may be disabled.

Further in the steady change analysis step, the correlation model generation unit may be directed to re-generate a correlation model, when a proportion that correlation models which have been disabled occupy in all correlation models exceeds a predetermined value.

In the steady change analysis step, it may be indicated that re-generation of the correlation model is needed, when a proportion that correlation models which have been disabled occupy in all correlation models exceeds a predetermined value.

As mentioned above, according to the second exemplary embodiment, a steady change analysis unit disables an element in the correlation models generated once which is destroyed steadily, while exhibiting the same operation effect as the first exemplary embodiment.

As a result, in the second exemplary embodiment, even when the characteristic of a system is changing gradually, it is possible to restrain unnecessary abnormality detection about performance information, and perform correct abnormality detection.

In the second exemplary embodiment, a highly precise analysis can always be maintained, because necessity to re-generate a correlation model can be shown to an administrator when there are a lot of disabled elements.

Other structures, other steps, and the operational effects thereof are the same as those of the case of the first exemplary embodiment described above. Further, the content of operation of each step and the structural elements of each unit and functions realized by them described above may be put into a program to be executed by a computer.

[Other Various Modifications]

Although the device and method according to the present invention have been described according to specific exemplary embodiments, it is possible to modify the exemplary embodiments described in various ways without departing from the scope of the present invention.

The number, position and shape or the like of the constructional elements are not limited to the above-mentioned exemplary embodiments, and the number, position and shape or the like which are suitable when the present invention is implemented can be selected. For example, in above-mentioned exemplary embodiment, as a judgment of whether a correlation at the time of calculation of an abnormal score in correlation change analysis is being collapsed or not, a case when a prediction error exceeds 20% has been illustrated. However, the present invention does not intend to limit these numbers.

Further, there may be a case where the size of correlation destruction is classified into a plurality of stages, without being limited to the case where correlation destruction is classified into two cases of existence or nonexistence of correlation destruction.

The operation control managing software according to the present invention may be installed in one PC, or it may be installed in a configuration which can be used by a terminal and a server in a client/server system or in P2P environment. Further, the various display screens may have a configuration accessible on the web.

(Program)

Further, the software program of the present invention for enabling the functions of the exemplary embodiments described above includes: each processing program executed in a program such as a program that corresponds to the processing units (processing means), functions and the like shown in the various block diagrams of each of the above-described exemplary embodiments and a program that corresponds to the processing procedures, the processing means, the functions and the like shown in the flowcharts and the like; and the whole part or a part of the method (steps), the described processing, and the data described all through the present specification.

Specifically, an operations management program of each exemplary embodiment can cause a computer provided in an operations management apparatus which acquires performance information for each of a plurality of performance items from a plurality of controlled units and manages operation of the controlled unit to realize various functions.

This operations management program can cause a computer to realize a method including: obtaining a correlation model for each element pair of performance information by deriving, when the performance items or the controlled units are designated as an element of the performance information, a correlation function between a first series of performance information that indicates time series variation about a first element and a second series of performance information that indicates time series variation about a second element, and generating the correlation model between the first element and the second element based on the correlation function (the composition of symbol 124 shown in FIG. 4 and the function of Step S12 shown in FIG. 11, for example); and analyzing a change in the correlation model based on the performance information acquired newly which has not been used for generation of the correlation model (the composition of symbol 123 shown in FIG. 4 and the function of Step S11 shown in FIG. 11, for example).

This operations management program may, in the analysis of a change in the correlation model, calculate a predicted value of the second element based on the first element of the performance information acquired newly which has not been used for generation of the correlation model and the correlation function, calculate a prediction error by comparing a value of the second element of the performance information acquired newly which has not been used for generation of the correlation model with the predicted value of the second element, and analyzes whether the prediction error is in a predetermined error range.

The operations management program also may, in the analysis of a change in the correlation model, when the prediction error is outside the error range, determine that a correlation between the first element and the second element has been destroyed, and calculate an abnormal score of the first element and the second element.

The operations management program further may, in the analysis of a change in the correlation model, based on the abnormal score, control so that each of the elements is presented being sequenced.

The operations management program may analyze whether the correlation of the correlation model is destroyed steadily.

The operations management program may, in the analysis of whether the correlation of the correlation model is destroyed steadily, disable the correlation model, the correlation of which is destroyed steadily.

The operations management program may, in the analysis of whether the correlation of the correlation model is destroyed steadily, direct the correlation model generation unit to re-generate the correlation model, when a proportion that correlation models which have been disabled occupy in all correlation models exceeds a predetermined value.

The operations management program may, in the analysis of whether the correlation of the correlation model is destroyed steadily, perform control to indicate that re-generation of the correlation model is needed, when a proportion that the correlation models which have been disabled occupy in all correlation models exceeds a predetermined value.

Further, the program described above may be of any forms such as an object code, a program executed by an interpreter, script data to be supplied to OS, and the like. The program can be implemented as high-standard procedure-type or object-oriented programming language, or as assembly or machine language according to need. In any case, the language may be of a compiler type or an interpreter type. The program incorporated in application software that can be operated in an ordinal personal computer, a portable information terminal, or the like, is also included.

As for a method for supplying the program, it is possible to provide the program from external equipment communicatively coupled to a computer by an electric communication line (wired or radio line) through the electric communication line.

For example, it is possible to provide the program by connecting to a web page of the internet using a browser of a computer and downloading from the web page the program itself or a file which is compressed including the automatic installation function to a recording medium such as a hard disk.

Further, it is also possible by dividing program codes configuring the program into a plurality of files, and downloading each of the files from different web pages.

In other words, a server which allows program files for realizing functional processing of the present invention on a computer to be downloaded to a plurality of users is also included in the scope of the present invention.

According to a program of the present invention, it is possible to achieve the above-described apparatus according to the present invention relatively easily by loading the program from a storage medium such as ROM that stores the control program to a computer (CPU) and having it executed by the computer, or by downloading the program to a computer via a communication unit and having it executed by the computer. When the spirit of the present invention is embodied as software of apparatus, the present invention naturally exists in a storage medium on which the software is stored and used.

There is no question that the program is all the same regardless of the reproduction stages thereof (whether the program is of a primary recorded program or secondarily recorded program). In case where the program is supplied by utilizing a communication line, the present invention is made use of by using the communication line as a transmission medium. Needless to say, the present invention can be specified as an invention of a program. Furthermore, dependent claims regarding the apparatus may be configured such that they correspond to dependent claims of the method and the program.

(Information Recording Medium)

Further, the program may be recorded in an information recording medium. An application program containing the program is stored in an information recording medium, and it is possible for a computer to read out the application program from the information recording medium and install the application program to a hard disk. With this, the program can be provided by being recorded in an information recording medium such as a magnetic recording medium, an optical recording medium, a ROM, or the like. Using such program-recorded information recording medium in a computer realizes to configure a convenient information processor.

As an information recording media for supplying the program, it is possible to use a semiconductor memory such as a ROM, a RAM, a flash memory, or a SRAM and an integrated circuit, an USE memory or a memory card including such, an optical disk, a magneto-optical disk, a magnetic recording medium, or the like. Further, the program may be recorded on a movable medium such as a flexible disk, a CD-ROM, a CD-R, a CD-RW, an FD, a DVD ROM, an HD DVD (HD DVD-R-SL: single layer, an HD DVD-R-DL: double layer, an HD DVD-RW-SL, an HD DVD-RW-DL, an HD DVD-RAM-SL), a DVD+/-R-SL, a DVD+/-R-DL, a DVD+/-RW-SL, a DVD+/-RW-DL, a DVD-RAM, a Blu-Ray Disk (Registered Trademark): a BD-R-SL, a BD-R-DL, a BD-RE-SL, a BD-RE-DL), an MO, a ZIP, a magnetic card, a magnetic tape, an SD card, a memory stick, a nonvolatile memory card, an IC Card, or may be recorded on a storage device such as a hard disk that is built-in on a computer system.

Further, the information recording medium is to include a medium such as a communication line which is used when transmitting the program via the communication line such as a network of the Internet or a telephone circuit or the like that kinetically holds the program for a short time (transmission medium or a carrier wave), and to include a medium that holds the program for a specific length of time, such as a volatile memory provided inside a computer system to be a server or a client of the above-described case.

Furthermore, in a case where an OS operated on a computer or an RTOS or the like on a terminal (for example, a mobile telephone) executes a part of or the whole processing, it is also possible to achieve the same functions and obtain the same effects as those of the exemplary embodiments described above.

Further, it is also possible to distribute a recording medium such as a CD-ROM in which the program is coded and stored to a user; let the user who satisfies a prescribed condition download key information for decoding the codes from a web page via the internet; and execute the coded program by using the key information to have the program installed to a computer. In this case, the structures of the present invention may include each structural element of the program (various means, steps, and data) and a coding means for coding the program (various means, steps, and data).

Furthermore, although the system according to the exemplary embodiments has been described as a client server system above, it may be a system by Peer-to-Peer communication where terminals configure a network and transmit/receive data each other without a server.

In that case, a manager may be a master terminal in a peer-to-peer method.

Also, there is no problem to integrate a system according to the above-described exemplary embodiments and other information processing systems to configure the whole of the systems as a system according to the present invention. This information processing system is to include OS and hardware such as peripheral equipment.

A system in the exemplary embodiment refers to one in which a plurality of apparatuses are assembled logically, and whether the apparatuses of each configuration are in the same chassis or not is not a question. For this reason, the present invention may be applied to a system including a plurality of equipment, and it may also be applied to an apparatus including one device. OS and hardware such as a peripheral device may be included in a system Further, as for the information processor on which the above-described program and the like are loaded, a server is not limited to a personal computer, but various servers, EWS (engineering work station), a medium-sized computer, a mainframe, or the like may be used. In addition to the above examples, an information terminal may be so structured that it can be utilized through a portable information terminal, various mobile terminals, a PDA, a portable telephone, a wearable information terminal, various kinds of (portable, for example) televisions, a DVD recorder, various kinds of audio equipment, a household appliance to which various information communication functions are incorporated, a game machine having a network function, etc. Alternatively, one which is modified as an application displayed on these terminals can also be included in the scope of the present invention.

Further, the above-described program may be a program that achieves a part of the functions described above, or may be a so-called difference file (difference program) which can achieve the above-described functions in combination with a program that has already been stored in the computer system.

Furthermore, the steps shown in the flowcharts of the present specification include not only the processing executed in a time series manner according to the depicted procedures but also the processing that is not necessarily executed in a time series manner but executed in parallel or individually. Regarding the actual implementation, the order of the program procedures (steps) can be altered. Further, depending on needs of an implementation, a specific procedure (step) described in the current specification can be implemented, eliminated, added, or rearranged as a combined procedure (step).

Further, the functions of the program such as each means and each function of the apparatus, and the functions of the procedures of each step may be achieved by dedicated hardware (a dedicated semiconductor circuit, for example), and a part of the whole functions of the program may be processed by the hardware, and the other functions may be processed by software. In a case of using the dedicated hardware, each unit may be formed by an integrated circuit such as an LSI. These units may be formed on a single chip individually, or apart or the entire units may be formed on a single chip. Further, the LSI may be provided with another functional block such as a streaming engine. Furthermore, the method for forming integrated circuit may not necessarily be limited to an LSI, and a dedicated circuit or a general-purpose processor may be employed. Moreover, if there is introduced a technique for achieving circuit integration in place of a LSI due to improvements in the semiconductor technique or other techniques derived therefrom, that techniques can naturally be used to integrate the functional blocks.

Further, "communication" may be radio communication, wired communication, or communication achieved by employing both the radio communication and the wired communication (i.e., communication is achieved by employing the radio communication in a certain section and by employing the wired communication in another section). In addition, "communication" may be achieved by employing the wired communication from a certain device to another device and employing the radio communication from another device to still another device.

Further, "communication" includes a communications net. As a network configuring the communications net, any of hardware structures can be employed, e.g., various circuit nets such as a portable telephone circuit net (including a base station and a switching system), a public telephone circuit net, an IP telephone net, an ISDN circuit net, or a net similar to those, the Internet (i.e., a communication mode using TCP/IP protocol), the Intranet, LAN (including Ethernet (Registered Trademark) and gigabit Ethernet (Registered Trademark)), WAN, an optical fiber communications net, a power-line communications net, various dedicated circuit net capable of handling broadband, etc. Further, the network may employ any kinds of protocols, and it may be a network using TCP/IP protocol, a network using any kinds of communication protocols other than the TCP/IP protocol, a virtual network built in a software-oriented manner, or a network similar to those. Furthermore, the network is not limited only to a wired network but may also be a radio (including a satellite communication, various high-frequency communication means, or the like) network (for example, a network including a single carrier communication system such as a handy phone system or a portable telephone, a spread spectrum communication system such as W-CDMA or a radio LAN conforming to IEEE802.11b, a multicarrier communication system such as IEEE802.11a or Hiper LAN/2) and combinations of those may be used, and a system connected to another network may also be employed. Further, the network may be of any form such as point-to-point, point-to-multipoints, multipoints-to-multipoints, etc.

Further, in a communication structure between an operations management apparatus and controlled units, an interface formed in one of or both sides of them may be of any types such as a parallel interface, a USB interface, IEEE1394, a network such as LAN or WAN, a type similar to those, or any interface that may be developed in the future.

Furthermore, the way to generate correlation model, and to perform correlation change analysis does not need to be limited only to a substantial device, it is easily understood that the present invention may function as a method thereof. Accordingly, the present invention regarding a method is not limited only to a substantial device but may also be effective as a method thereof. In this case, an operations management apparatus and an operations management system may be included as examples for realizing the method.

Such an operations management system may be used alone or may be used while being mounted to an apparatus, for example, and thus the technical spirit of the present invention is not limited only to such cases but may also include various forms. Therefore, the present invention may be applied to software or hardware, and the forms thereof may change as needed. When the technical spirit of the present invention is embodied as software of an apparatus, the present invention naturally exists on a recording medium on which the software is recorded and is utilized.

Further, a part of the present invention may be achieved by software and the other part thereof may be achieved by hardware, or a part thereof may be stored on a recording medium to be read accordingly and as needed. When the present invention is achieved by software, it may be structured to use hardware and an operating system, or may be achieved separately from those.

It is supposed that the scope of the invention is not limited to the examples of illustration.

Furthermore, various stages are included in each of the above-described exemplary embodiments, and it is possible to extract various inventions therefrom by combining a plurality of structural elements disclosed therein. That is, the present invention includes various combinations of each of the exemplary embodiments as well as combinations of any one of the exemplary embodiments and any one of modifications examples thereof. In such cases, operational effects obvious from each structure disclosed in each of the exemplary embodiments and the modifications examples thereof are to be included in the operational effects of an exemplary embodiment, even if there are no specific depictions of those in the exemplary embodiment. Inversely, all the structures that provide operational effect depicted in the exemplary embodiments are not necessarily the essential structural elements of the substantial feature part of the present invention. Moreover, an exemplary embodiment configured by omitting some structural elements from the entire structural elements disclosed in the exemplary embodiments, and the technical range based upon the structure thereof may also be taken as the invention.

Each of the exemplary embodiments and the modification examples thereof are merely presented as examples out of variety of embodiments of the present invention for helping the present invention to be understood easily. That is, they are just showing examples when putting the present invention into effect, are illustrative, are not intended to limit the scope of the present invention, and various modifications and/or changes can be applied as needed. It is to be understood that the present invention can be embodied in various forms based upon the technical spirit and the main features thereof, and the scope of the technical spirit of the present invention is not to be limited by the exemplary embodiments and the modification examples thereof.

Accordingly, it is to be understood that each of the elements disclosed above is to include all the design changes and the equivalent thereof within the scope of the technical spirit of the present invention.

In an operations management apparatus of related technology, there are following problems.

That is, in an operations management apparatus of related technology, when a threshold value is set low, in a case such as where a fluctuation of performance information is large, there is a problem that a false report occurs frequently, and an administrator is confused. When the threshold value is set highly, there is a problem that failures except for serious ones cannot be detected any more, and thus detection of performance abnormality such as a case where the operating response speed degrades although a system is still operating is difficult.

Further, although the abnormal value of each element of performance information can be detected, there is a problem that abnormality caused by relation with a value of another element of performance information which has relation of input/output such as a bottleneck cannot be detected.

Thus, in threshold value monitoring of performance information in related technology, there is a problem that it cannot detect performance abnormality such as response degradation correctly, and that consequently it cannot specify the occurring place of the abnormality.

In a method to calculate a correlation of performance information at the time of abnormality, there is a problem that it is difficult to determine whether the correlation is generated only at the time of abnormality or whether it exists at normal times also.

In Japanese Patent Application Laid-Open No. 2006-024017, an operations management apparatus has to collect the history of all processing which can be related and analyze it in order to predict a correct load. When a system is magnified or when it cooperates with other systems, there is a problem that relation between processing and a load becomes very complicated, a load of data collection and an analysis is large, and thus high knowledge for analyzing that is needed.

In Japanese Patent Application Laid-Open No. 2002-342182, because it simply shows relation between performance information items at the time when a failures occurs, there is a problem that an administrator has to verify which actually is the cause among a plurality of elements of performance information which can have causality with a certain abnormality.

There is also a problem that it is difficult to determine whether the correlation is generated only the time of abnormality or whether it exists at normal times also.

In Japanese Patent Application Laid-Open No. 2006-146668, a correlation coefficient between obtained operation information items is a value, and from correlation of values at some point of time (the time of abnormality), the associated cause of the abnormality can be shown. However, because correlation of future values that do not exist cannot be calculated, there is a problem that an administrator has to verify which actually is the cause among a plurality of elements of performance information which can have causality with a certain abnormality. In Japanese Patent Application Laid-Open No. 2006-146668, there is a problem that a sign of a failure cannot be detected.

In Japanese Patent Application Laid-Open No. 2007-207117, a function of each performance information item is presumed. Then, in the formula of y=f(x), x expresses a time change of one y. An operations management apparatus prepares two such formulas, and the relation between the two is determined by a correlation rule given separately. Because a rule is not generated automatically, when not giving a rule between all performance information elements of a system separately, there is a problem that the operations management apparatus cannot predict correctly which actually is the cause among a plurality of elements of performance information which can have causality with a certain abnormality.

That is, because correlation between the CPU utilization rate and the throughput is a correlation only between an element and another element, and as a result, an administrator has to verify which actually is the cause among a plurality of elements of performance information which can have causality with a certain abnormality.

In a Published Japanese translation of PCT application No. 2005-524886 bulletin, a correlation model is not used, although a conversion of a workload and metrics is performed. Accordingly, there is a problem that an administrator has to verify which actually is the cause among a plurality of elements of performance information which can have causality with a certain abnormality, and thus the administrator has to input everything of these conversion methods by handwork.

According to the present invention, a correlation model generation unit generates a correlation model by deriving a correlation function for time series information of two elements of performance information (a series of performance information). When new performance information which has not been used for generation of a correlation model is acquired, the correlation change analysis unit analyzes whether the performance information acquired newly is performance information conforming to the correlation function of a correlation model which has been already generated, that is, whether there is a change or not in the correlation in the correlation model (whether the correlation is kept or collapsed).

An exemplary advantage according to the invention is that it can provide an operations management apparatus, an operations management system, a data processing method and an operations management program which can specify the occurring place of an abnormality (an element with abnormality) according to whether a correlation generated at the time of normal operation is deformed or not; and detect performance abnormality such as response degradation and a sign of a failure correctly and specify an occurring place by modeling a correlation of detected performance information, and monitoring a change of the model.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. An operation management apparatus which acquires performance information for each of a plurality of performance items from a controlled device, comprising:
    a correlation model generation unit which generates a correlation model including a correlation function for a pair of series of performance information indicating time series variation of the performance information; and
    a correlation change analysis unit which analyzes whether correlation indicated by the correlation function is kept by applying the performance information acquired newly to the correlation function and outputs information on an analysis result.

2. The operations management apparatus according to claim 1, wherein
    the correlation model generation unit generates the correlation model by calculating a coefficient of the correlation function between one and another of the pair of series of performance information for every the pair of the series of performance information.

3. The operations management apparatus according to claim 2, wherein
    the correlation change analysis unit calculates a predicted performance information by applying the performance information acquired newly to the correlation function related thereto, and calculates a prediction error by comparing the predicted performance information with the performance information actually detected for the predicted performance information.

4. The operations management apparatus according to claim 3, wherein
    the correlation change analysis unit determines that the correlation indicated by the correlation function is kept if the prediction error is within a predetermined error range.

5. The operations management apparatus according to claim 4, wherein
    the correlation change analysis unit determines whether the correlation indicated by the correlation function is kept or not for every the correlation function related to the performance information acquired newly in the correlation model.

6. The operations management apparatus according to claim 5, wherein
    the correlation model generation unit calculates a weight for the correlation function based on a difference between a predicted value calculated by applying a value of one of the pair of the series of performance information to the correlation function and a value of another of the pair of the series of performance information, and generates the correlation model including the correlation function and the weight for every the pair of the series of performance information.

7. The operations management apparatus according to claim 6, wherein
    the correlation change analysis unit determines whether the correlation indicated by the correlation function is kept or not for every the correlation function having the weight being equal to or grater than a predetermined threshold in the correlation model.

8. An operation management system comprising:
    a controlled device; and
    an operations management apparatus which acquires performance information for each of a plurality of performance items from the controlled device, wherein
    the operations management apparatus includes:
    a correlation model generation unit which generates a correlation model including a correlation function for a pair of series of performance information indicating time series variation of the performance information; and
    a correlation change analysis unit which analyzes whether correlation indicated by the correlation function is kept by applying the performance information acquired newly to the correlation function and outputs information on an analysis result.

9. A data processing method of an operations management apparatus which acquires performance information for each of a plurality of performance items from a controlled device, comprising:
    generating a correlation model including a correlation function for a pair of series of performance information indicating time series variation of the performance information;
    analyzing whether correlation indicated by the correlation function is kept by applying the performance information acquired newly to the correlation function; and
    outputting information on an analysis result.

10. The data processing method according to claim 9, wherein
    the generating generates the correlation model by calculating a coefficient of the correlation function between one and another of the pair of series of performance information for every the pair of the series of performance information.

11. The data processing method according to claim 10, wherein
the analyzing calculates a predicted performance information by applying the performance information acquired newly to the correlation function related thereto, and calculates a prediction error by comparing the predicted performance information with the performance information actually detected for the predicted performance information.

12. The data processing method according to claim 11, wherein
the analyzing determines that the correlation indicated by the correlation function is kept if the prediction error is within a predetermined error range.

13. The data processing method according to claim 12, wherein
the analyzing determines whether the correlation indicated by the correlation function is kept or not for every the correlation function related to the performance information acquired newly in the correlation model.

14. The data processing method according to claim 13, wherein
the generating calculates a weight for the correlation function based on a difference between a predicted value calculated by applying a value of one of the pair of the series of performance information to the correlation function and a value of another of the pair of the series of performance information, and generates the correlation model including the correlation function and the weight for every the pair of the series of performance information.

15. The data processing method according to claim 14, wherein
the analyzing determines whether the correlation indicated by the correlation function is kept or not for every the correlation function having the weight being equal to or grater than a predetermined threshold in the correlation model.

16. A non-transitory computer readable data storage medium recording thereon an operation management program, the program causing an operations management apparatus which acquires performance information for each of a plurality of performance items from a controlled device, to perform a method comprising:
generating a correlation model including a correlation function for a pair of series of performance information indicating time series variation of the performance information; and
analyzing whether correlation indicated by the correlation function is kept by applying the performance information acquired newly to the correlation function and outputs information on an analysis result.

17. An operation management apparatus which acquires performance information for each of a plurality of performance items from a controlled device, comprising:
correlation model generation means for generating a correlation model including a correlation function for a pair of series of performance information indicating time series variation of the performance information; and
correlation change analysis means for analyzing whether correlation indicated by the correlation function is kept by applying the performance information acquired newly to the correlation function and outputting information on an analysis result.

* * * * *